United States Patent
Maeda et al.

(10) Patent No.: US 6,324,860 B1
(45) Date of Patent: Dec. 4, 2001

(54) DEHUMIDIFYING AIR-CONDITIONING SYSTEM

(75) Inventors: Kensaku Maeda, Tokyo; Hideo Inaba, Okayama, both of (JP)

(73) Assignee: Ebara Corporation

( * ) Notice: Subject to any disclaimer, the term of this patent is extended or adjusted under 35 U.S.C. 154(b) by 0 days.

(21) Appl. No.: 09/530,021

(22) PCT Filed: Oct. 23, 1998

(86) PCT No.: PCT/JP98/04805

§ 371 Date: Apr. 24, 2000

§ 102(e) Date: Apr. 24, 2000

(87) PCT Pub. No.: WO99/22181

PCT Pub. Date: May 6, 1999

(30) Foreign Application Priority Data

Oct. 24, 1997 (JP) .................................................. 9-309612
Oct. 24, 1997 (JP) .................................................. 9-609613

(51) Int. Cl.[7] ............................. F25D 23/00; F25D 17/06
(52) U.S. Cl. .................................................. 62/271; 62/96
(58) Field of Search ........................... 62/271, 94, 238.3, 62/238.6, 79, 333, 335

(56) References Cited

U.S. PATENT DOCUMENTS

| | | | |
|---|---|---|---|
| 4,887,437 | 12/1989 | Fenton et al. | 62/186 |
| 5,325,676 | 7/1994 | Meckler | 62/93 |
| 5,364,455 | 11/1994 | Komarneni et al. | 95/117 |
| 5,426,953 | * 6/1995 | Meckler | 62/271 |
| 5,448,895 | 9/1995 | Coellner et al. | 62/94 |
| 5,718,122 | 2/1998 | Maeda | 62/185 |
| 5,758,509 | 6/1998 | Maeda | 62/94 |
| 5,761,923 | 6/1998 | Maeda | 62/271 |
| 5,761,925 | 6/1998 | Maeda | 62/476 |
| 5,791,157 | 8/1998 | Maeda | 62/483 |
| 5,816,065 | 10/1998 | Maeda | 62/271 |
| 5,860,284 | * 1/1999 | Goland et al. | 62/94 |
| 5,931,015 | 8/1999 | Maeda | 62/271 |
| 5,943,874 | 8/1999 | Maeda | 62/271 |
| 5,950,442 | 9/1999 | Maeda et al. | 62/175 |
| 5,950,447 | 9/1999 | Maeda et al. | 62/271 |
| 5,966,955 | 10/1999 | Maeda | 62/238.3 |

FOREIGN PATENT DOCUMENTS

| | | |
|---|---|---|
| 61-138038 | 6/1986 | (JP) . |
| 8-14600 | 1/1996 | (JP) . |
| 8-189667 | 7/1996 | (JP) . |

* cited by examiner

Primary Examiner—William Doerrler
Assistant Examiner—Chen-Wen Jiang
(74) Attorney, Agent, or Firm—Armstrong, Westerman, Hattori, McLeland & Naughton, LLP

(57) ABSTRACT

It is an object of the present invention to provide a dehumidifying air-conditioning system which increases the entire energy efficiency thereof to have a low operating cost, consume reduced electric energy in daytime, and radiate minimum heat into the atmosphere in thermal storage operation at night. The dehumidifying air-conditioning system has a heat pump for forming a vapor compression heat pump cycle, a path for processing air to be cooled by a low temperature heat source of the heat pump after moisture is adsorbed therefrom by a desiccant, a path for regenerating air which, after being heated by a high temperature heat source of the heat pump, passes through the desiccant that has adsorbed moisture to regenerate the desiccant, a chilling medium circulation path for cooling the processing air with the low temperature heat source of the heat pump, a heating medium circulation path for heating the regenerating air with the high temperature heat source of the heat pump, a first thermal storage device for cooling a chilling medium prior to being cooled by the low temperature heat source of the heat pump, and a second thermal storage device for heating a heating medium prior to being heated by the high temperature heat source of the heat pump.

23 Claims, 15 Drawing Sheets

DEHUMIDIFYING AIR-CONDITIONING SYSTEM

TECHNICAL FIELD

The present invention relates to an air-conditioning system which employs a desiccant, and more particularly to an air-conditioning system which employs a heat pump as a heat source for heating regenerating air and cooling processing air.

BACKGROUND ART

FIG. 11 of the accompanying drawings shows an air-conditioning system comprising a combination of an absorption heat pump (200: represented by HP) as a heat source and an air-conditioning unit employing a desiccant, i.e., a so-called desiccant air-conditioning unit.

The air-conditioning system comprises an air-conditioning unit having a path A for processing air from which moisture has been adsorbed by a desiccant wheel 103, a path B for regenerating air which is heated by a heat source and thereafter passes through the desiccant wheel 103 that has adsorbed the moisture in order to desorb the moisture from the desiccant, and an air-conditioning unit having a sensible heat exchanger 104 between the processing air from which moisture has been adsorbed and the regenerating air to be regenerated by the desiccant wheel 103 and heated by the heat source, and a heat pump 200. The regenerating air of t he air-conditioning unit is heated by a heater 120 using the high temperature heat source of the heat pump 200 as a heating source, for thereby regenerating the desiccant, and the processing air of the air-conditioning unit is cooled by a cooler 115 using the low temperature heat source of the heat pump as a cooling heat source.

The air-conditioning system is arranged such that the heat pump simultaneously cools the processing air and heats the regenerating air of the desiccant air-conditioning unit. Based on drive energy applied to the heat pump from an external source, the heat pump produces an effect of cooling the processing air. The desiccant is regenerated by the sum of the heat removed from the processing air by the operation of the heat pump and the drive energy applied to the heat pump. Therefore, the drive energy applied from the external source is utilized in multiple ways for a high energy-saving effect.

If a motor-operated heat pump, e.g., a vapor compression heat pump, is used as the heat source of the air-conditioning unit, then it is proposed to add a thermal storage device to the air-conditioning unit for the purposes of reducing electricity consumption in summer days and saving the operation cost based on the use of inexpensive midnight power services, as in the general case of the conventional air-conditioning systems. FIG. 12 of the accompanying drawings shows an air-conditioning system which is a combination of a heat source assembly including a built-in thermal storage device and a so-called desiccant air-conditioning unit, constructed based on the conventional arrangement.

As shown in FIG. 12, a heat source assembly 300 with a thermal storage function has a high-temperature thermal storage tank 310 for heating regenerating air and a low-temperature thermal storage tank 330 for cooling processing air. For thermal storage operation at night, a heat pump 200, a heating medium circulatory system, and a chilling medium circulatory system are operated to remove heat from the low-temperature thermal storage tank 330 and transfer the heat to the high-temperature thermal storage tank 310 for simultaneously storing cooling effect and heating effect. The heat pump 200 comprises a compressor 360, a condenser 320, an expansion valve 350, and an evaporator 340. The hearing medium circulatory system comprises a pump 312, a path 314, the condenser 320, a path 314, the high-temperature thermal storage tank 310, and a path 311. The chilling medium circulatory system comprises a pump 332, a path 333, the evaporator 340, a path 334, the low-temperature thermal storage tank 330, and a path 331. For air-conditioning operation using thermal storage stored in daytime, a heating medium circulatory system for the air-conditioning unit and a chilling medium circulatory system for the air-conditioning unit are operated, in addition to the heat pump and the chilling and heating medium circulatory systems for the heat sources. The heating medium circulatory system for the air-conditioning unit comprises a pump 315, a path 316, the high-temperature thermal storage tank 310, a path 122, a heater 120, and a path 123. The chilling medium circulatory system for the air-conditioning unit comprises a pump 335, a path 336, the low-temperature thermal storage tank 330, a path 117, a cooler 115, and a path 118. By using both of the stored cooling effect and the stored heating effect for a portion of the air-conditioning load, air-conditioning operation can be achieved while saving electric energy in daytime. Since both of the cooling effect and heating effect can be stored simultaneously at night, the air-conditioning system discharges no heat whatsoever into the atmosphere thereby to prevent thermal pollution, i.e., prevent the city from becoming a heat island at night.

However, in order to achieve a desiccant air-conditioning cycle under standard air-conditioning conditions in summer as indicated by the psychrometric chart shown in FIG. 13 of the accompanying drawings, a temperature difference is needed to transfer heat in the heat exchangers and the thermal storage tanks. It is necessary that the higher heat source temperature be higher than the temperature of the regenerating air prior to the regeneration of the desiccant (state T: 70° C.), and that the lower heat source temperature be lower than the temperature of the processing air prior to the humidifier (state N: 19° C.). Therefore, a problem arises in that a temperature lift in the heat pump during the thermal storage operation becomes abnormally high.

An example will be described below.

An air cycle of the desiccant air-conditioning operation is formed under summer meteorological conditions by making the following state changes: Air in an air-conditioned room 101 (processing air: state K: 27° C., 10.8 k/kg) is drawn via a path 107 by a fan 102, increased in pressure, and supplied via a path 108 to the desiccant wheel 103 where moisture in the air is adsorbed by an absorbent such as silica gel, the humidity ratio of the air is lowered, and the temperature of the air is increased by the heat of adsorption (state L; 45° C., 5.8 g/kg). The air whose humidity is lowered and temperature is increased is sent via a path 109 to the sensible heat exchanger 104 where the air is cooled by a heat exchange with outside air (regenerating air) (state M: 33° C.). The cooled air is delivered via a path 110 to the chilled water heat exchanger (cooler) 115 which further cools the air (state N: 19° C.). The cooled air is then delivered via a path 111 to a humidifier 105 where the temperature of the air is lowered in an isenthalpic process by the way of water injection or evaporative cooling (state P), after which the air is returned as supply air via a path 112 to the air-conditioned room 101. In this manner, an enthalpic difference ΔQ is developed between the return air (state K) and the supplied air (state P) in the room, thus cooling the air-conditioned room 101. The desiccant is regenerated as follows: Outside air for regenerating (OA: state Q: 30° C., 19 g/kg) is drawn via a path 124 by a fan 140, increased, in pressure, and supplied to the sensible heat exchanger 104 where the regenerating air cools the processing air and is increased in temperature (state R: 42° C.). The regenerating air thus flows via a path 125 into a next sensible heat exchanger 121 in which the regenerating air is increased in temperature by a heat exchange with high-temperature air that has regenerated the desiccant (state S: 50° C.). The regenerating air which has left the sensible heat exchanger 121 flows via a path 126 into the hot water heat exchanger (heater) 120 where the regenerating air is heated by hot water with its temperature increased to 70° C. and relative humidity lowered (state T). The regenerating air with its relative humidity lowered passes through the desiccant wheel 103, desorbing moisture of the desiccant wheel 103 (state U; 52° C., 28.5 g/kg). The regenerating air which has passed through the desiccant wheel 103 flows via a path 128 into the sensible heat exchanger 121 where it preheats the regenerating air from the sensible heat exchanger 104. After its temperature is lowered in the sensible heat exchanger 121 (state V), the regenerating air is discharged via a path 129 as discharged air. In this manner, the regeneration of the desiccant, the dehumidification of the processing air, and the cooling of the processing air are repeated to perform desiccant air-conditioning operation.

A temperature relationship of the low temperature heat source which is required to cool the processing air from 33° C. to 19° C. in the air-conditioning system having the thermal storage tanks shown in FIG. 12 is illustrated in FIG. 14 of the accompanying drawings.

It can be seen from FIG. 14 that on the assumption of a heat exchanging temperature efficiency of 75%, the heating medium (cold water) in the air-conditioning unit for cooling the processing air needs a cold water inlet temperature of 15° C. which is 4° C. lower than a regenerating air outlet temperature, and in order for the low-temperature heat storage medium to deprive the chilling medium (cold water) in the air-conditioning unit of heat, a phase change temperature of the low-temperature thermal storage medium requires 12° C. which is 3° C. lower than the temperature of the chilling medium (cold water). In order for the low-temperature heating medium (cold water) in the heat source to deprive the low-temperature thermal storage medium of heat in thermal storage operation, an inlet temperature of the chilling medium (cold water) for the heat source requires 5° C. which is 7° C. lower than the phase change temperature of the low-temperature thermal storage medium. In order for the heat pump 200 as a heat source to deprive the chilling medium (cold water) in the heat source of heat, an evaporation temperature of the heat pump 200 as a heat source requires 3° C. which is 2° C. higher than the inlet temperature of the chilling medium (cold water) in the heat source. Therefore, the evaporation temperature of the heat pump 200 as a heat source needs to be 3° C. which is 16° C. lower than 19° C. that is the temperature of the processing air after it has been cooled.

Similarly, a temperature relationship of the heat source which is required to increase the temperature of the regenerating air from 50° C. to 70° C. is shown in FIG. 15 of the accompanying drawings. It can be seen from FIG. 15 that on the assumption of a heat exchanging temperature efficiency of 75%, the heating medium (hot water) in the air-conditioning unit for heating the regenerating air needs a hot water inlet temperature of 77° C. which is 7° C. higher than a regenerating air outlet temperature, and in order to transfer heat from the thermal storage medium to the heating medium (hot water) in the air-conditioning unit, a phase change temperature of the thermal storage medium requires 80° C. which is 3° C. higher than the temperature of the heating medium (hot water). In order to transfer heat from the heating medium (hot water) in the heat source to the thermal storage medium in thermal storage operation, an inlet temperature of the heating medium (hot water) in the heat source requires 87° C. which is 7° C. higher than the phase change temperature of the thermal storage medium. In order to transfer heat from the heat pump 200 as a heat source to the heating medium (hot water) in the heat source, a condensation temperature of the heat pump 200 as a heat source requires 89° C. which is 2° C. higher than the inlet temperature of the heating medium (hot water) in the heat source. Therefore, the condensation temperature of the heat pump 200 as a heat source needs to be 89° C. which is 19° C. higher than 70° C. that is the highest temperature of the regenerating air.

In the air-conditioning system shown in FIG. 12, therefore, for storing thermal storage, it is necessary to operate the heat pump at the evaporation temperature of 3° C. and the condensation temperature of 89° C. Consequently, the temperature lift of the heat pump 200 becomes an extremely high value of 89° C., resulting in an efficiency reduction, and a popular compressor for air-conditioning applications cannot be used, resulting in an increased in the cost.

The present invention has been made in view of the above drawbacks. It is an object of the present invention to provide a dehumidifying air-conditioning system which makes it possible to add a thermal storage device to a desiccant air-conditioning system that uses a motor-operated heat pump as a heat source, so that inexpensive midnight power services can be used, a temperature lift of the heat pump as a heat source can be suppressed to a low value for an increased coefficient of performance in both thermal storage operation and dehumidifying air-conditioning operation based on thermal storage, and an increased energy efficiency of the overall air-conditioning system, and which has a low operating cost, consumes reduced electric energy in daytime, and radiates minimum heat into the atmosphere in thermal storage operation at night.

DISCLOSURE OF INVENTION

According to a first embodiment of the invention there is provided a dehumidifying air-conditioning system having a heat pump for forming a vapor compression heat pump cycle, a path for processing air to be cooled by a low temperature heat source of the heat pump after moisture is adsorbed therefrom by a desiccant, and a path for regenerating air which, after being heated by a high temperature heat source of the heat pump, passes through the desiccant that has adsorbed moisture to regenerate the desiccant, the arrangement being such that the processing air and the regenerating air alternately flow through the desiccant, characterized by a chilling medium circulation path for cooling the processing air with the low temperature heat source of said heat pump, a heating medium circulation path for heating the regenerating air with the high temperature heat source of said heat pump, a first thermal storage device for cooling a chilling medium prior to being cooled by the low temperature heat source of said heat pump, and a second thermal storage device for heating a heating medium prior to being heated by the high temperature heat source of said heat pump, the arrangement being such that said heat pump operates with said first thermal storage device as the low temperature heat source and said second thermal storage device as the high temperature heat source, to store cooling effect in the first and heating effect in the second thermal storage devices.

Based on the fact that the heat transfer process for the processing air and the regenerating air for desiccant air-conditioning is carried out by way of changes in the sensible heat of air, the process of cooling the processing air as performed by the thermal storage device is a high-temperature process, and the process of heating the regenerating air as performed by the thermal storage device is a low-temperature process. By reducing the temperature difference in each of the thermal storage devices, the temperature lift of the heat pump required for thermal storage operation can be reduced. Therefore, it is possible to provide a dehumidifying air-conditioning system which makes it possible to add thermal storage devices to a desiccant air-conditioning system that uses a motor-operated heat pump as a heat source, so that inexpensive midnight power services can be used, a temperature lift of the heat pump as a heat source can be suppressed to a low value for an increased coefficient of performance in both thermal storage operation and dehumidifying air-conditioning operation based on stored cooling and heating effects, and an increased energy efficiency of the overall air-conditioning system, and which has a low operating cost, consumes reduced electric energy in daytime, and radiates minimum heat into the atmosphere in storage operation at night.

According to a second embodiment of the invention, the dehumidifying air-conditioning system is characterized by a first chilling medium circulation path extending through the first thermal storage device, a low temperature heat source heat exchanger of the heat pump, and a heat exchanger for cooling the processing air, a second chilling medium circulation path extending through the first thermal storage device and the low temperature heat source heat exchanger of the heat pump, said first chilling medium circulation path and said second chilling medium circulation path being selectable one at a time, a first heating medium circulation path extending through the second thermal storage device, a high temperature heat source heat exchanger of the heat pump, and a heat exchanger for heating the regenerating air, and a second heating medium circulation path extending through the second thermal storage device and the high temperature heat source heat exchanger of the heat pump, said first heating medium path being selectable one at a time, the arrangement being such that in a mode of operation to discharge stored cooling and heating effects, a path provided by said first chilling medium circulation path and said first heating medium circulation path is selected to pass a heat transfer medium therethrough, and in a mode of operation to store the cooling and heating effects, a path provided by said second chilling medium circulation path and said second heating medium circulation path is selected to pas heat transfer.

The heat pump, the first or second thermal storage device, and the desiccant air-conditioning unit are connected to each other by the first and second chilling medium circulation path and the first and second heating medium circulation path, and controlled in operation to achieve various modes of operation such as a mode of operation for thermal storage and a mode of operation for discharging stored cooling and heating effects.

According to a third embodiment of the invention, the dehumidifying air-conditioning system is characterized in that the heat pump is constructed in two cycles, and the chilling medium circulation path and the heating medium circulation path are arranged such that the high temperature heat source of the second heat pump cycle downstream of the low temperature heat source of the first cycle in the chilling medium circulation path is disposed upstream of the high temperature heat source of the first cycle in the heating medium circulation path.

According to a fourth embodiment of the invention, the dehumidifying air-conditioning system is characterized in that the heat pump is constructed in two cycles, and the low temperature heat source and the high temperature heat source of each of the cycles are arranged respectively in forward and reverse orientations in the chilling medium circulation path and the heating medium circulation path.

Based on the fact that temperature changes of the processing air and the regenerating air in the desiccant air-conditioning unit are caused by sensible heat changes and are large, the heat pump cycle is divided into a plurality of heat pump cycles, one composed of a combination of the low temperature heat source of lower temperature and the high temperature heat source of lower temperature, and one composed of a combination of the low temperature heat source of higher temperature and the high temperature heat source of higher temperature. The temperature lifts of the respective heat pumps are thus reduced for an energy saving effect.

According to a fifth embodiment of the invention, the dehumidifying air-condition system is characterized in that the first thermal storage device contains a latent heat storage material which undergoes a latent heat change in the range from 13 to 23° C., and the second thermal storage device contains a latent heat storage material which undergoes a latent heat change in the range from 65 to 75° C.

The thermal storage devices containing the respective latent heat storage materials have an increased thermal storage density and are made compact.

According to a sixth embodiment of the invention there is a provided a dehumidifying air-conditioning system having a first heat pump for forming a vapor compression heat pump cycle, a path for processing air to be cooled by a low temperature heat source of the first heat pump after moisture is adsorbed therefrom by a desiccant, and a path for regenerating air which, after being heated by a high temperature heat source of the first heat pump, passes through the desiccant that has adsorbed moisture to regenerate the desiccant, the arrangement being such that the processing air and the regenerating air alternately flow through the desiccant, characterized by a first thermal storage device for cooling the processing air prior to being cooled by the low temperature heat source of said first heat pump, and a second thermal storage device for heating the regenerating air prior to being heated by the high temperature heat source of said first heat pump, the arrangement being such that a second heat pump operates with said first thermal storage device as the low temperature heat source and said second thermal storage device as the high temperature heat source to store cooling effects in the first and heating effect in the second thermal storage devices.

Based on the fact that the heat transfer process for the processing air and the regenerating air for desiccant air-conditioning is carried out by way of changes in the sensible heat of air, the process of cooling the processing air as performed by the thermal storage device is a high-temperature process, and the process of heating the regenerating air as performed by the thermal storage device is a low-temperature process. By reducing the temperature difference in each of the thermal storage devices, the temperature lift of the heat pump required for thermal storage operation can be reduced. Therefore, it is possible to provide a dehumidifying air-conditioning system which makes it possible to add thermal storage devices to a desiccant air-conditioning system that uses a motor-operated heat pump as a heat source, so that inexpensive midnight power services can be used, a temperature lift of the heat pump as a heat source can be suppressed to a low value for an increased coefficient of performance in both thermal storage operation and dehumidifying air-conditioning operation based on thermal storages, and an increased energy efficiency of the overall air-conditioning system, and which has a low operating cost, consumes reduced electric energy in daytime, and radiates minimum heat into the atmosphere in thermal storage operation at night.

According to a seventh embodiment of the invention, the dehumidifying air-conditioning system is characterized by a first chilling medium circulation path for removing a cooling effect from the first thermal storage device and leading the cooling effect to a heat exchanger for exchanging heat with the processing air to cool the processing air, a first heating medium circulation path for removing a heating effect from the second thermal storage device and leading the heating effect to a heat exchanger for exchanging heat with the regenerating air to heat the regenerating air, a second chilling medium circulation path for removing a cooling effect from an evaporator of the second heat pump and sending the cooling effect to the first thermal storage device, a second heating medium circulation path for removing a heating effect from a condenser of the second thermal storage device, the arrangement being such that in a mode of operation to store cooling and heating effect, the second heat pump is operated to pass a heat transfer medium through said second chilling medium circulation path and said second heating medium circulation path, and in a mode of operation to discharge stored cooling and heating effect, said heat pump is inactivated to pass a heat transfer medium through said first chilling medium circulation path and said first heating medium circulation path.

The second heat pump, the first and second thermal storage devices, and the desiccant air-conditioning unit are connected to each other by the first and second chilling medium circulation path and the first and second heating medium circulation path, and controlled in operation to achieve various modes of operation such as a mode of operation for thermal storage and a mode of operation for discharging stored cooling and heating effects.

According to an eighth embodiment of the invention, the dehumidifying air-conditioning system is characterized in that said second heat pump forms a vapor compression heat pump cycle, and said first and second pumps share a compressor.

The cost is reduced by thus sharing one compressor between the first and second heat pumps.

According to a ninth embodiment of the invention, the dehumidifying air-conditioning system is characterized in that the first thermal storage device contains a latent heat storage material which undergoes a latent heat change in the range from 16 to 26° C., and the second thermal storage device contains a latent heat storage material which undergoes a latent heat change in the range from 62 to 72° C.

The thermal storage devices containing the respective latent heat storage materials have an increased thermal storage density and are made compact.

The latent heat storage material contained in the first thermal storage device may comprise paraffin-based n-hexadecane (C16H34).

The latent heat storage material contained in the first thermal storage device may comprise an aqueous solution containing at least potassium acetate as a solute.

The latent heat storage material contained in the first thermal storage device may comprise a mixture containing at least calcium chloride hexahydrate, magnesium chloride hexahydrate, and magnesium bromide hexahydrate.

The latent heat storage material contained in the first thermal storage device may comprise a mixture containing at least calcium chloride hexahydrate and nickel nitrate hexahydrate.

The latent heat storage material contained in the first thermal storage device may comprise a mixture containing at least calcium chloride hexahydrate and ferric nitrate nonahydrate.

The latent heat storage material contained in the first thermal storage device may comprise a mixture containing at least disodium hydrogenphosphate dodecahydrate.

The latent heat storage material contained in the first thermal storage device may comprise a mixture containing at least sodium sulfate decahydrate and sodium carbonate.

The latent heat storage material contained in the first thermal storage device may comprise a mixture containing at least sodium sulfate decahydrate and ammonium carbamate.

The latent heat storage material contained in the second thermal storage device may comprise polyethylene glycol having a nominal molecular weight in the range from 5400 to 6600.

The latent heat storage material contained in the second thermal storage device may comprise stearic acid.

The latent heat storage material contained in the second thermal storage device may comprise biphenyl.

In the dehumidifying air-conditioning system according to the fifth embodiment of the invention, the latent heat storage material contained in the second thermal storage device may comprise n-paraffin having 30 to 35 carbon atoms.

In the dehumidifying air-conditioning system according to the ninth embodiment of the invention, the latent heat storage material contained in the second thermal storage device may comprise n-paraffin having 29 to 33 carbon atoms.

In the dehumidifying air-conditioning system according to the ninth embodiment of the invention, the latent heat storage material contained in the second thermal storage device may comprise plamitic acid.

By using the various latent heat storage materials, the thermal storage device having a high heat storage density is provided which is optimum for use as a heat source for a desiccant air-conditioning process.

BEST MODE FOR CARRYING OUT THE INVENTION

Figure 1:
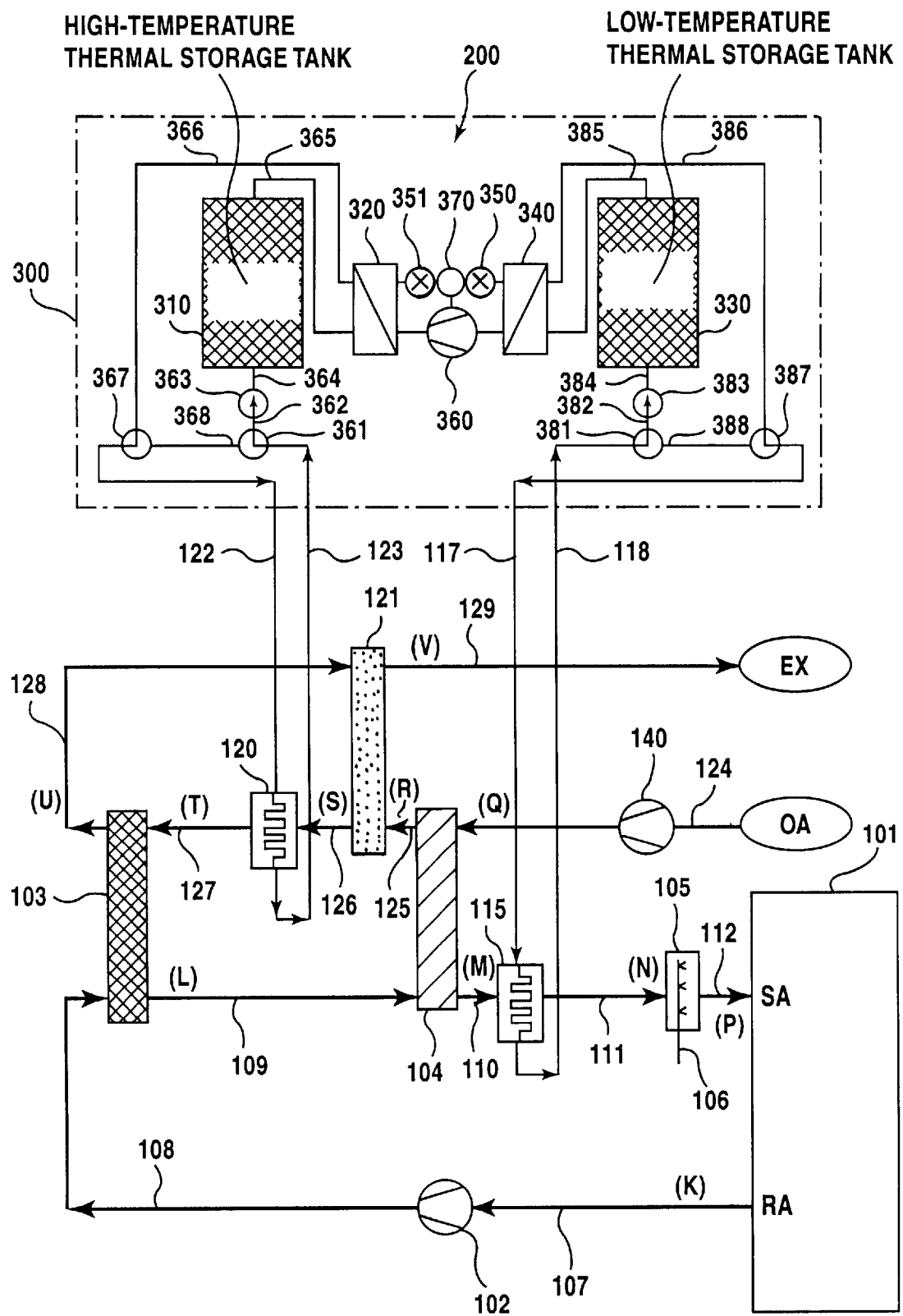
FIG. 1 is a view showing a basic arrangement of a dehumidifying air-conditioning system according to a first embodiment of the present invention.

Embodiments of dehumidifying air-conditioning systems according to the present invention will be described below with reference to the drawings. FIG. 1 is a view showing a basic arrangement of a dehumidifying air-conditioning system according to a first embodiment of the present invention. In this embodiment, a desiccant air-conditioning unit connected to a heat source assembly 300 by two heat transfer medium paths is constructed as follows: A desiccant wheel 103 is arranged such that a desiccant rotates in given cycles across both a path A for processing air and a path B for regenerating air, as in the case of the system described with reference to FIG. 12. The processing air path A connects an air-conditioned space to an inlet port of a fan 102 for introducing return air via a path 107. The fan 102 has an outlet port connected to a first zone of the desiccant wheel 103 for performing a process of adsorbing moisture, via a path 108. The desiccant wheel 103 has an outlet for processing air which is connected to a sensible heat exchanger 104 that is in heat exchanging relationship to regenerating air, via a path 109. The sensible heat exchanger 104 has an outlet for processing air which is connected to a cooler 115 that exchanges heat with a chilling medium (cold water) of the heat source assembly 300, via a path 110. The cooler 115 has an outlet for processing air which is connected to a humidifier 105 via a path 111. The humidifier 105 has an outlet for processing air which is connected to a processing air outlet as an air supply port via a path 112. The processing air path A thus forms a cycle for processing air.

The regenerating air path B connects an inlet port of a fan 140 for introducing outside air which will serve as regenerating air, via a path 124. The fan 140 has an outlet port connected to the sensible heat exchanger 104 which is in heat exchanging relationship to processing air. The sensible heat exchanger 104 has an outlet for regenerating air which is connected to a low-temperature fluid passage of a sensible heat exchanger 121 that is in heat exchanging relationship to regenerating air that has regenerated the desiccant. The sensible heat exchanger 121 has an outlet for low-temperature regenerating air which is connected to a heater 120 that exchanges heat with a heating medium (hot water) of the heat source assembly 300, via a path 126. The heater 120 has an outlet for regenerating air which is connected to a second zone of the desiccant wheel 103 for performing a process of the regeneration of regenerating air, via a path 127. The second zone of the desiccant wheel 103 for performing the process of the regeneration of regenerating air has an outlet for regenerating air which is connected to a high-temperature fluid passage of the sensible heat exchanger 121 via a path 128. The sensible heat exchanger 121 has a high-temperature fluid passage outlet connected to the external space via a path 129. The regenerating air path B thus forms a cycle for introducing regenerating air from the external space and discharging regenerating air into the external space.

Figure 13:
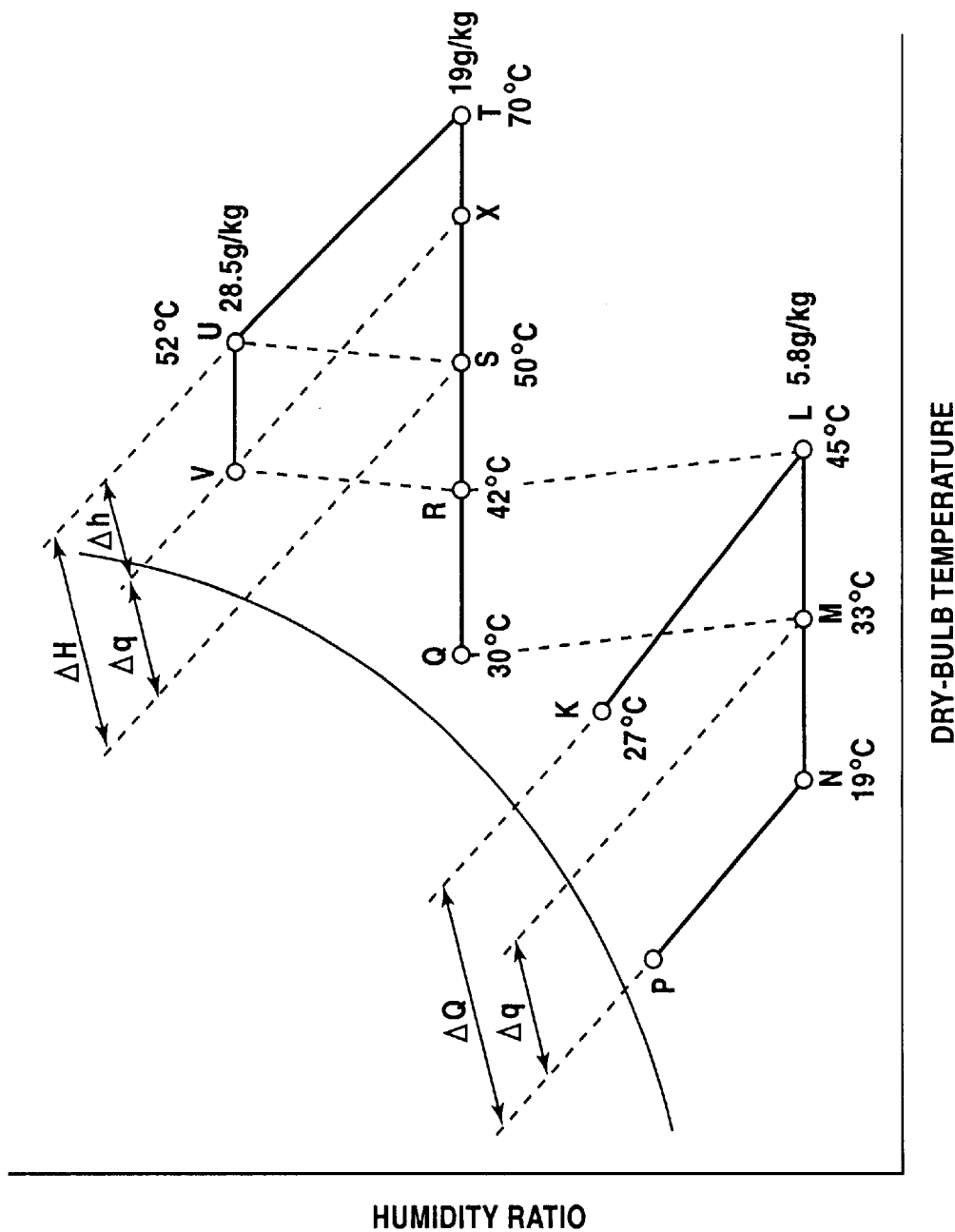
FIG. 13 is a psychrometric chart showing operation of the dehumidifying air-conditioning apparatus shown in FIG. 12.
Figure 14:
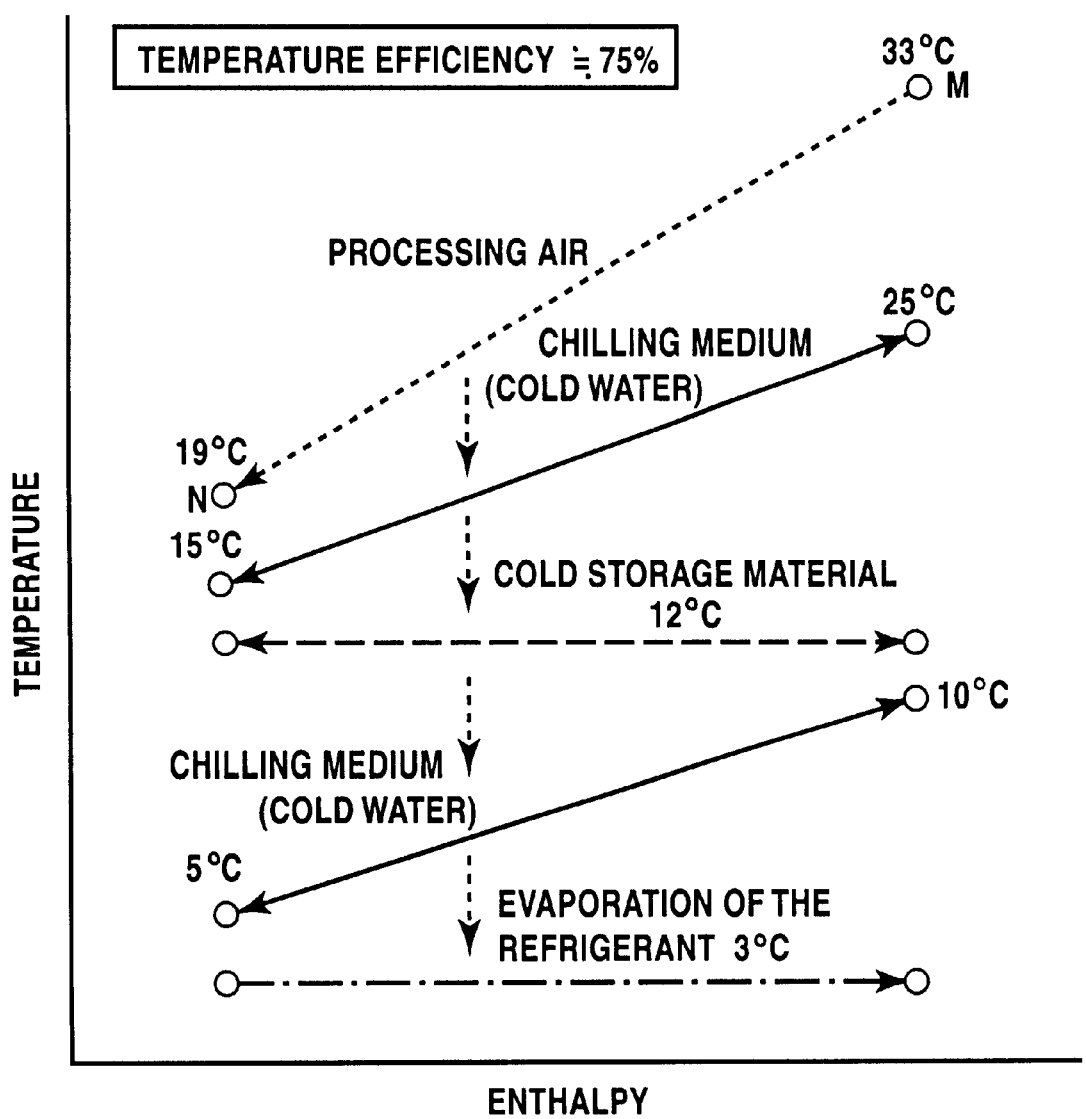
FIG. 14 is a diagram showing the temperature relationship of a low heat source which is required for the dehumidifying air-conditioning apparatus shown in FIG. 12 to cool processing air.
Figure 15:
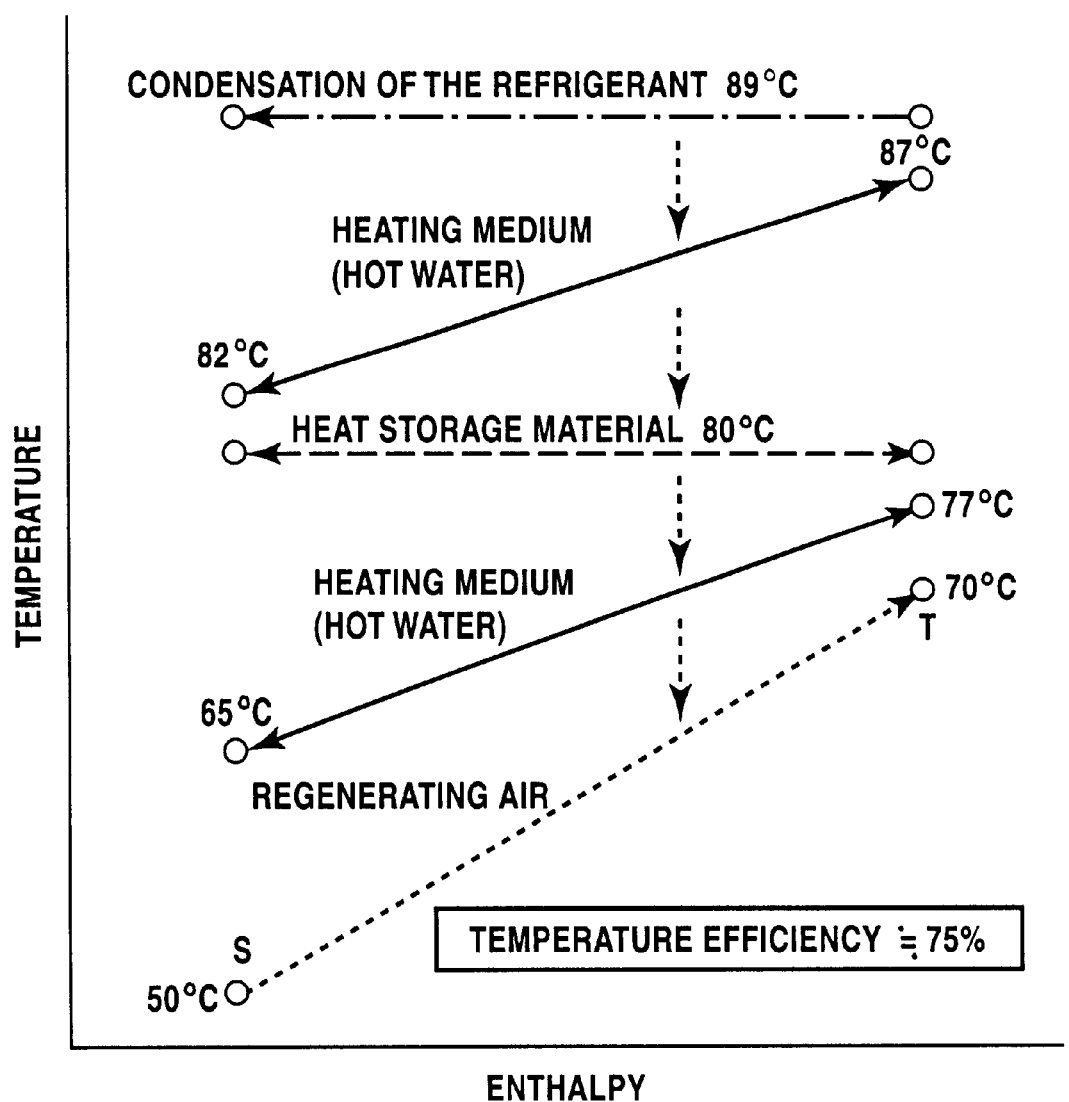
FIG. 15 is a diagram showing the temperature relationship of a heat source which is required for the dehumidifying air-conditioning apparatus shown in FIG. 12 to increase the temperature of regenerating air.

Circled alphabetical letters D–V in FIG. 1 are representative of respective states of air which correspond to those shown in FIG. 13. As in the case of conventional desiccant air-conditioning units, the desiccant which rotates in given cycles across both the processing air path A and the regenerating air path B is divided into the first zone which is connected to the processing air path A via the paths 108, 109 for performing the process of adsorbing moisture, and the second zone which is connected to the regenerating air path B via the paths 127, 128 for performing the process of the regeneration of regenerating air. The desiccant goes through the first zone and the second zone, and returns to the first zone.

The desiccant air-conditioning unit is constructed as described above. The desiccant air-conditioning unit and the heat source assembly 300 are coupled to each other by a first chilling medium circulation path and a first heating medium circulation path. The first chilling medium circulation path is a path to circulate a chilling medium through a first thermal storage tank 330, a low temperature heat source heat exchanger (evaporator) 340 of a heat pump 200, and the heat exchanger (cooler) 115 for cooling processing air. The first heating medium circulation path is a path to circulate a heating medium through a second thermal storage tank 310, a high temperature heat source heat exchanger (condenser) 320 of the heat pump 200, and the heat exchanger 120 for heating regenerating air.

The heat source assembly 300 with a storage function has the first thermal storage tank (low-temperature thermal storage tank) 330 for cooling processing air, and the second thermal storage tank (high-temperature thermal storage tank) 310 for heating regenerating air. The heat source assembly 300 also has a heat pump 200 as a heat source which comprises a vapor compression heat pump comprising a compressor 360, the condenser 320, an expansion valve 350, and the evaporator 340. The heat pump 200 forms a cycle in which a wet vapor as a low-pressure refrigerant exchanges heat with the chilling medium downstream of the first thermal storage tank 330 in the evaporator 240, and a high-pressure refrigerant vapor exchanges heat with the heating medium downstream of the second thermal storage tank 310 in the condenser 320. In this embodiment, in view of a high temperature lift of the heat pump 200, the expansion valve comprises two stages (350, 351) with an economizer 370 disposed intermediate therebetween. A refrigerant vapor generated by self-evaporation under an intermediate pressure is drawn into an intermediate stage of the compressor thereby providing a so-called economizer cycle.

The first chilling medium circulation path provides a circulation path through a pump 383, a path 384, the first thermal storage tank 330, a path 385, the low temperature heat source heat exchanger (evaporator) 340 of the heat pump 200, a path 386, a three-way valve 387, the path 117, the heat exchanger 115 for cooling processing air, a path 118, a three-way valve 381, and a path 382. A second chilling medium circulation path provides a circulation path through the pump 383, the path 384, the first thermal storage tank 330, the path 385, the low temperature heat source heat exchanger (evaporator) 340 of the heat pump 200, the path 386, the three-way valve 387, a path 388, the three-way valve 381, and the path 382. The first chilling medium circulation path and the second chilling medium circulation path are selectively switched by the three-way valves 381, 387. The first heating medium circulation path provides a circulation path through a pump 363, a path 364, the second thermal storage tank 310, a path 365, the high temperature heat source heat exchanger (condenser) 320 of the heat pump 200, a path 366, a three-way valve 367, a path 122, the heat exchanger (heater) 120 for heating regenerating air, a path 123, a three-way valve 361, and a path 362. A second heating medium circulation path provides a circulation path through the pump 363, the path 364, the second thermal storage tank 310, the path 365, the low temperature heat source heat exchanger (condenser) 320 of the heat pump 200, the path 366, the three-way valve 367, a path 368, the three-way valve 361, and the path 362. The first heating medium circulation path and the second heating medium circulation path are selectively switched by the three-way valves 361, 367. For a mode of operation to discharge stored cooling and heating effects, the three-way valves 387 is shifted to connect the path paths 386, 117 to each other, the three-way valves 381 is shifted to connect the path paths 118, 382 to each other, the three-way valves 367 is shifted to connect the paths 366, 122 to each other, and the three-way valves 361 is shifted to connect the paths 123, 362 to each other, thereby to select the first chilling medium circulation path and the first heating medium circulation path, as shown in FIG. 1. For a mode of operation to store the cooling and heating effects, the three-way valves 387 is shifted to connect the paths 386, 388 to each other, the three-way valves 381 is shifted to connect the paths 388, 382 to each other, the three-way valves 367 is shifted to connect the paths 366, 368 to each other, and the three-way valves 361 is shifted to connect the paths 368, 362 to each other, thereby to select the second chilling medium circulation path and the second heating medium circulation path.

With the above arrangement, based on the fact that the heat transfer process for the processing air and the regenerating air for desiccant air-conditioning is carried out by way of changes in the sensible heat of air, the process of cooling the processing air as performed by the thermal storage tank is a high-temperature process, and the process of heating the regenerating air as performed by the thermal storage tank is a low-temperature process.

The first thermal storage tank (low-temperature thermal storage tank) 330 contains a latent heat storage material which undergoes a latent heat change in the range from 13 to 23° C. or higher, e.g., fuses from a solid into a liquid, to absorb heat from the chilling medium, when it exchanges heat with the chilling medium, and the second thermal storage tank (high-temperature thermal storage tank) 310 contains a latent heat storage material which undergoes a latent heat change in the range from 65 to 75° C. or lower, e.g., solidifies from a liquid into a solid, to radiate heat into the heating medium, when it exchanges heat with the heating medium.

Such latent heat storage materials are introduced by known literature (e.g., Japan Refrigeration Association "Refrigeration", Vol. 71, No. 823; Energy Resources Society "Energy storage system", 1992, Osaka; Heat Storage/Heat Increase Technical Committee "Heat storage/heat increase technology", IPC, Tokyo, 1985; Industrial Technical Council/Energy Saving Technology Development Sectional Meeting, Super Heat Pump/Energy Integration System Research and Development Evaluation Report, New Energy/Industrial Technical Development Mechanism, Fuel/Storage Development Department, Tokyo, 1993, etc.) as follows:

1) Paraffin-based n-hexadecane (C16H34) has a fusion temperature of 18.2° C. and a fusion heat of 229 kJ/kq. 2) An aqueous solution containing at least potassium acetate as a solute has a fusion temperature ranging from 15 to 26° C.

3) A mixture containing at least calcium chloride hexahydrate, magnesium chloride hexahydrate, and magnesium bromide hexahydrate has a fusion temperature ranging from 19 to 21° C.

4) A mixture containing at least calcium chloride hexahydrate and nickel nitrate hexahydrate has a fusion temperature ranging from 10 to 30° C.

5) A mixture containing at least calcium chloride hexahydrate and ferric nitrate nonahydrate has a fusion temperature ranging from 10 to 30° C.

6) A mixture containing at least disodium hydrogenphosphate dodecahydrate has a fusion temperature ranging from 15 to 35° C.

7) A mixture containing at least sodium sulfate decahydrate and sodium carbonate has a fusion temperature up to 23° C.

8) A mixture containing at least sodium sulfate decahydrate and ammonium carbamate has a fusion temperature ranging from 22 to 27° C.

9) N-paraffin having 30 to 35 carbon atoms has a fusion temperature ranging from 67.5 to 74.6° C., and n-paraffin having 29 to 33 carbon atoms has a fusion temperature ranging from 63.5 to 71.8° C.

10) Polyethylene glycol having a nominal molecular weight of 6000 has a fusion temperature of 66° C. and a fusion heat of 190 kJ/kg.

11) Stearic acid has a fusion temperature of 71° C. and a fusion heat of 203 kJ/kg.

12) Biphenyl has a fusion temperature of 71° C. and a fusion heat of 119 kJ/kg.

13) Palmitic acid has a fusion temperature of 63° C. and a fusion heat of 187 kJ/kg.

Operation of the dehumidified air-conditioning system thus constructed will be described below with reference to FIGS. 2 and 3.

Figure 2:
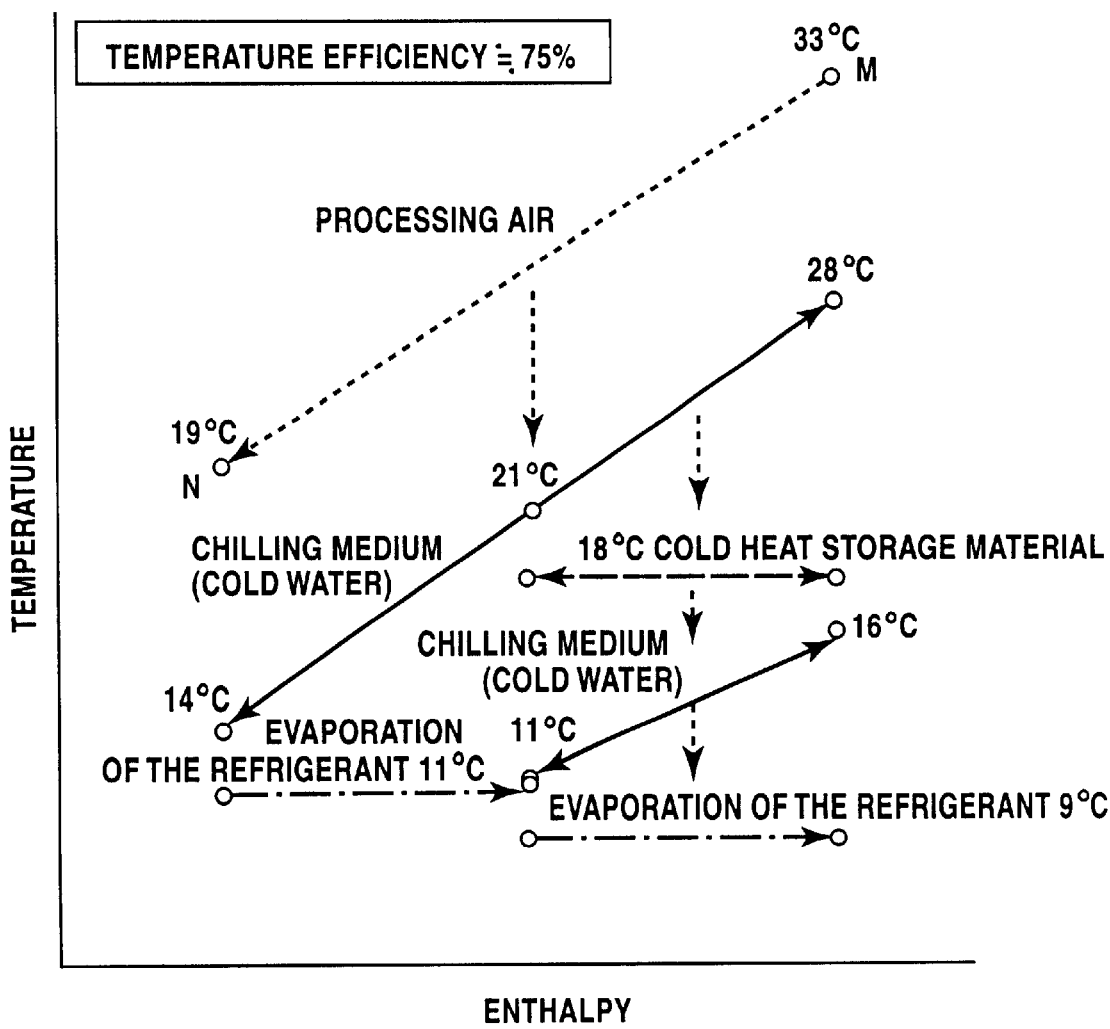
FIG. 2 is a diagram showing the relationship between the operating temperatures and enthalpic changes of processing air, a latent heat storage material, a chilling medium, and a heat pump according to the first embodiment.
Figure 3:
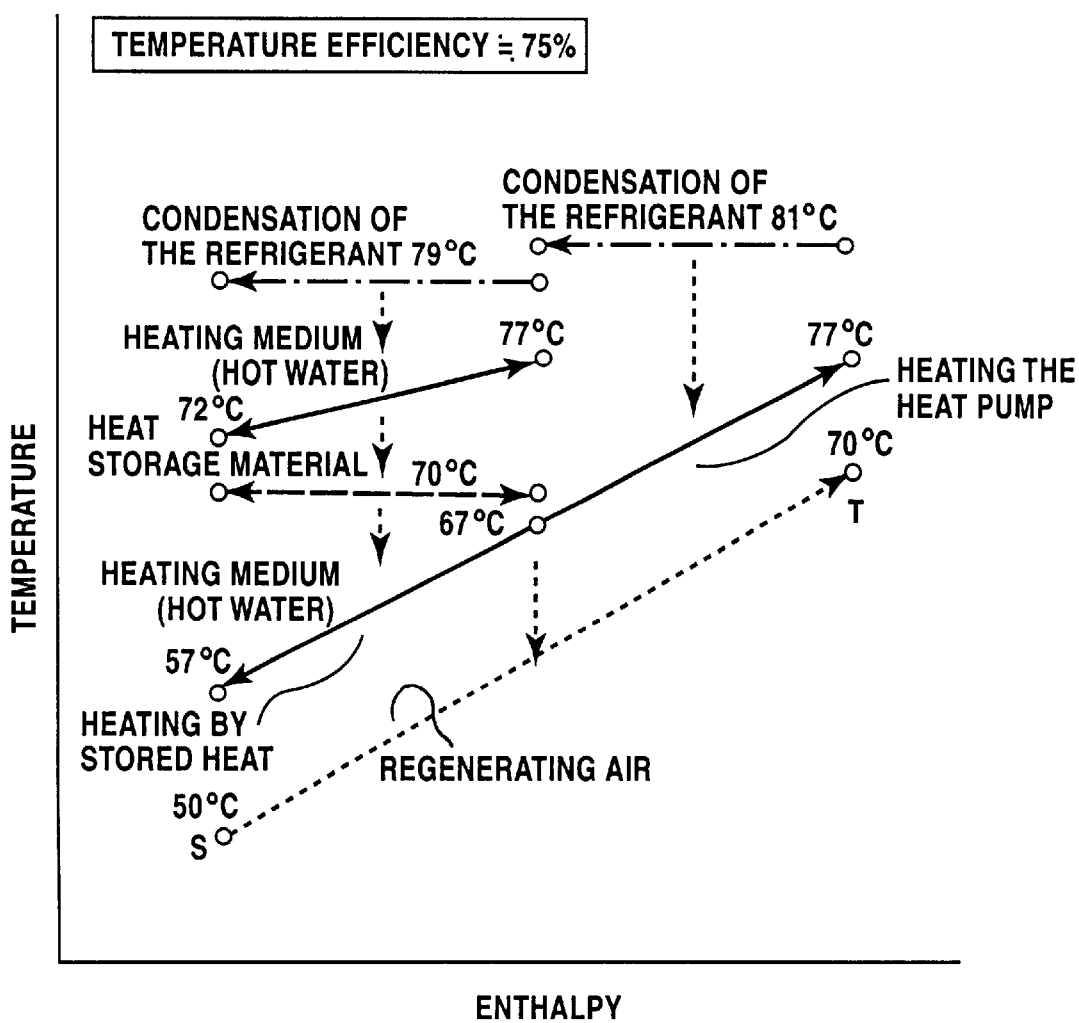
FIG. 3 is a diagram showing the relationship between the operating temperatures and enthalpic changes of regenerating air, a latent heat storage material, a heating medium, and a heat pump according to the first embodiment.

FIG. 2 is a diagram showing the relationship between the operating temperatures and enthalpic changes of the processing air, the latent heat storage material, the chilling medium, and the heat pump 200 according to the first embodiment. FIG. 3 is a diagram showing the relationship between the operating temperatures and enthalpic changes of the regenerating air, the latent heat storage material, the heating medium, and the heat pump 200 according to the first embodiment. In FIGS. 2 and 3, for an easier understanding of the operation, the temperatures of latent heat changes of the latent heat storage material are represented by intermediate temperatures of the latent heat change, with 18° C. for lower temperatures and 70° C. for higher temperatures. Practically, however, a material whose phase change occurs within the above temperature range may be employed for achieving the advantages of the present invention.

First, a mode of operation of the heat source assembly 300 for heat storage using midnight power services will be described below. In this mode of operation, the heat pump 200 is operated, and the three-way valves 387 is shifted to connect the paths 386, 388 to each other, the three-way valves 381 is shifted to connect the paths 388, 382 to each other, the three-way valves 367 is shifted to connect the paths 366, 368 to each other, and the three-way valves 361 is shifted to connect the paths 368, 362 to each other, thereby to select the second chilling medium circulation path and the second heating medium circulation path for allowing the heat transfer medium to flow therethrough. The compressor 360, the pump 383, and the pump 363 are operated to circulate the heat transfer medium through the second chilling medium circulation path and the second chilling medium circulation path is a circulation path through the pump 383, the path 384, the first thermal storage tank 330, the path 385, the low temperature heat source heat exchanger (evaporator) 340 of the heat pump 200, the path 386, the three-way valve 387, the path 388, the three-way valve 381, and the path 382. The second chilling medium circulation path is a circulation path through the pump 363, the path 364, the second thermal storage tank 310, the path 365, the high heat source heat exchanger (condenser) 320 of the heat pump 200, the path 366, the three-way valve 367, the path 368, the three-way valve 361, and the path 362.

In this mode of operation, the evaporator 340 of the heat pump 200 cools cold water in the second chilling medium circulation path. The cold water cooled by the evaporator 340 cools the latent heat storage material in the low-temperature thermal storage tank 330 to solidify the latent heat storage material when the temperature of the latent heat storage material is lowered to 18° C. or lower. The condenser 320 of the heat pump 200 heats hot water in the second heating medium circulation path. The hot water heated by the condenser 320 heats the latent heat storage material in the high-temperature thermal storage tank 310 to fuse the latent heat storage material when the temperature of the latent heat storage material is elevated to 70° C. or higher. The phase change temperatures of the latent heat storage materials are established under daytime air-conditioning unit operating conditions as follows:

In this embodiment, a temperature change of the cold water which exchanges heat with the processing air is determined on the assumption that the amount of the processing air to be cooled by the thermal storage tank is half the total amount to be cooled, and that a temperature change of the cold water is 14° C. which is the same as the processing air temperature. If the heat exchanging temperature efficiency is about 75% and the difference between outlet and inlet temperatures of the cold water is 14° C., then since the cold water at the inlet temperature of 14° C. exchanges heat with the processing air and its outlet temperature becomes 28° C., the temperature of the cold water at the outlet of the first thermal storage tank is 21° C. which is an intermediate value between these temperatures. A phase change temperature of the latent heat material which has such a cooling effect is determined as 18° C. on the assumption that the heat exchanging temperature efficiency is about 75% and the difference between outlet and inlet temperatures of the cold water is 7° C. Similarly, a temperature change of the hot water which exchanges heat with the regenerating air is determined on the assumption that the amount of the regenerating air to be heated by the thermal storage tank is half the total amount to be heated, and that a temperature change of the hot water is 20° C. which is the same as the regenerating air temperature. If the heat exchanging temperature efficiency is about 75% and the difference between outlet and inlet temperatures of the cold water is 20° C., then since the hot water at the inlet temperature of 57° C. exchanges heat with the regenerating air and its outlet temperature becomes 77° C., the temperature of the hot water at the outlet of the second thermal storage tank is 67° C. which is an intermediate value between these temperatures. A phase change temperature of the latent heat material which has such a heating effect is determined as 70° C. on the assumption that the heat exchanging temperature efficiency is about 75% and the difference between outlet and inlet temperatures of the cold water is 10° C.

In this manner, the cold storage at 18° C. and the hot storage at 70° C. are simultaneously accomplished in the low-temperature thermal storage tank 330 and the high-temperature thermal storage tank 310. The evaporating temperature of the heat pump 200 which is required at this time is calculated on the assumption that the heat exchanging temperature efficiency of each heat exchanger is about 75%, as shown in FIG. 2. If the difference between outlet and inlet temperatures of the thermal storage tank of the second chilling medium circulation path (cold water system) is 5° C., then the inlet temperature of the thermal storage tank is about 11° C., and the evaporating temperature is about 9° C. The condensing temperature of the heat pump 200 is calculated on the assumption that the heat exchanging temperature efficiency of each heat exchanger is about 75%, as shown in FIG. 3. If the difference between outlet and inlet temperatures of the thermal storage tank of the second heating medium circulation path (hot water system) is 5° C., then the inlet temperature of the thermal storage tank is about 77° C., and the condensing temperature is about 79° C. Therefore, the cycle of the second heat pump has an operating state represented by the evaporating temperature of 9° C. and the condensing temperature of 79° C., and can operate with a temperature lift of 70° C.

A mode of operation of the heat source assembly 300 for a dehumidifying air-conditioning (so-called cooling) process using stored effects in daytime will be described below. Prior to this mode of operation, the above thermal storage mode of operation is carried out, and the first thermal storage tank (low-temperature thermal storage tank) 330 stores a cooling effect which is principally a latent heat whose phase change occurs at 18° C., and the second thermal storage tank (high-temperature thermal storage tank) 310 stores a heating effect which is principally a latent heat whose phase change occurs at 70° C. In this mode of operation, the fans 102, 140 of the desiccant air-conditioning unit are operated. In the heat source assembly 300, the compressor 360 of the heat pump 200 is operated. The pumps 383, 363 are operated to circulate the chilling and heating mediums through the respective two heat transfer medium paths interconnecting the heat source assembly 300 and the air-conditioning unit, i.e., the first chilling medium circulation path and the first heating medium circulation path. The first chilling medium circulation path is a circulation path through the pump 383, the path 384, the first thermal storage tank 330, the path 385, the low heat source heat exchanger (evaporator) 340 of the heat pump 200, the path 386, the three-way valve 387, the path 117, the heat exchanger 115 for cooling processing air, the path 118, the three-way valve 381, and the path 382. The first heating medium circulation path is a circulation path through the pump 363, the path 364, the second thermal storage tank 310, the path 365, the high temperature heat source heat exchanger (condenser) 320 of the heat pump 200, the path 366, the three-way valve 367, the path 122, the heat exchanger (heater) 120 for heating regenerating air, the path 123, the three-way valve 361, and the path 362.

The cycle of the heat pump 200 in the above mode of operation will be described below. The refrigerant is evaporated in the low temperature heat source heat exchanger (evaporator) 340 by depriving the cold water cooled by the cold storage tank 330 of evaporating latent heat. The refrigerant is drawn into and compressed by the compressor 260. The refrigerant then flows into the high temperature heat source heat exchanger (condenser) 320 in which it discharges the sensible heat and condensing latent heat of the superheated vapor of the refrigerant into the hot water heated by the second thermal storage tank 310. The refrigerant reaches the first expansion valve 350 in which it is reduced in pressure and expanded, and then flows into the economizer 370 in which it is self-evaporated into a vapor. The refrigerant is drawn into the intermediate stage of the compressor 360. Thereafter, the refrigerant reaches the second expansion valve 351 in which it is reduced in pressure and expanded, after which it flows back into the evaporator 240.

Operation of the dehumidifying air-conditioning unit which uses the heat pump 200 and the thermal storage tanks as heat sources will be described below with reference to the psychrometric chart shown in FIG. 13.

Introduced return air (processing air: state K) is drawn via the path 107 by the fan 102, increased in pressure, and supplied via the path 108 to the first zone of the desiccant wheel 103 where moisture in the air is adsorbed by a moisture adsorbent of the desiccant wheel 103, the humidity ratio of the air is lowered, and the temperature of the air is increased by the heat of adsorption (state L). The air whose humidity is lowered and temperature is increased is sent via the path 109 to the sensible heat exchanger 104 where the air is cooled by a heat exchange with regenerating air (state M). The cooled air is delivered via the path 110 to the cooler 115 which cools the air with the cold water from the heat source assembly 300 (state N). The cooled processing air is then delivered to the humidifier 105 where the temperature of the air is lowered in an isenthalpic process by the way of water injection or evaporative cooling (state P), after which the air is returned as supply air via the path 112 to the air-conditioned room.

The desiccant wheel is regenerated as follows: Outside air (state Q) to be used as regenerating air is drawn via the path 124 by the fan 140, increased in pressure, and supplied to the sensible heat exchanger 104 where the regenerating air cools the processing air (state L) whose moisture has been adsorbed by the desiccant and is increased in temperature (state R). The regenerating air thus flows into the next sensible heat exchanger 121 which increases the temperature of the regenerating air (state R) by a heat exchange with the regenerating air (state U) teat has regenerated the desiccant. The regenerating air flows via the path 126 into the heater 120 where the regenerating air is heated by hot water from the heat source assembly 300 (state T). The regenerating air which has left the condenser 220 passes through the second zone of the desiccant wheel 103 for regenerating the regenerating air, desorbing moisture of the desiccant wheel 103 to regenerate the desiccant wheel 103 (state U). The regenerating air (state U) which has passed through the desiccant wheel 103 flows via the path 128 into the sensible heat exchanger 121 where the regenerating air is reduced in temperature (state V) by exchanging heat with the regenerating air (state R) prior to regenerating the desiccant. The regenerating air is then discharged via the path 129 as discharged air.

In this manner, the regeneration of the desiccant, the dehumidification of the processing air, and the cooling of the processing air are repeated to perform desiccant air-conditioning operation. In this embodiment, because of the first thermal storage tank for cooling the chilling medium before it is cooled by the low temperature heat source of the heat pump 200 and the second thermal storage tank for heating the heating medium before it is heated by the high temperature heat source of the heat pump 200, the air-conditioning process can be carried out without increasing the temperature lift of the heat pump 200. The reasons for the above air-conditioning process will be described below with reference to FIGS. 2 and 3.

FIG. 2 shows the temperature relationship of the low temperature heat source required to cool the processing air from 33° C. to 19° C. in the dehumidifying air-conditioning (so-called cooling) process using stored cooling effect. The processing air is cooled by the cold water, and the cold water necessary to cool the processing air is cooled in the thermal storage tank 330 before it is cooled by the low temperature heat source of the heat pump 200. In this embodiment, a temperature change of the cold water which exchanges heat with the processing air is determined on the assumption that the amount of the processing air to be cooled by the thermal storage tank is half the total amount to be cooled, and that a temperature change of the cold water is 14° C. which is the same as the processing air temperature. If the heat exchanging temperature efficiency is about 75% and the difference between outlet and inlet temperatures of the cold water is 14° C., then since the cold water at the inlet temperature of 14° C. exchanges heat with the processing air and its outlet temperature becomes 28° C., the temperature of the cold water at the outlet of the first thermal storage tank is 21° C. A phase change temperature of the latent heat material which has such a cooling effect is determined as 18° C. on the assumption that the heat exchanging temperature efficiency is about 75% and the difference between outlet and inlet temperatures of the cold water is 7° C. Thus, the cold water can be removed at 21° C. from the first thermal storage tank which contains the latent heat storage material at 18° C., and delivered to the evaporator 340. The evaporating temperature of the refrigerant which exchanges heat with the cold water flowing into the evaporator 340 at 21° C. is calculated as 11° C. on the assumption that the heat exchanging temperature efficiency is about 75% and the difference between outlet and inlet temperatures of the cold water is 7° C. Therefore, the desired dehumidifying air-conditioning (cooling) process can be performed by operating the heat pump 200 at the evaporating temperature of 11° C.

Similarly, the regenerating air is heated by the hot water, and the hot water necessary to heat the regenerating air is cooled in the thermal storage tank 310 before it is heated by the high temperature heat source of the heat pump 200. In this embodiment, a temperature change of the hot water which exchanges heat with the regenerating air is determined on the assumption that the amount of the regenerating air to be heated by the thermal storage tank is half the total amount to be heated, and that a temperature change of the hot water is 20° C. which is the same as the regenerating air temperature. If the heat exchanging temperature efficiency is about 75% and the difference between outlet and inlet temperatures of the cold water is 20° C., then since the hot water at the inlet temperature of 57° C. exchanges heat with the regenerating air and its outlet temperature becomes 77° C., the temperature of the hot water at the outlet of the second thermal storage tank is 67° C. A phase change temperature of the latent heat material which has such a heating effect is determined as 70° C. on the assumption that the heat exchanging temperature efficiency is about 75% and the difference between outlet and inlet temperatures of the cold water is 10° C. Thus, the hot water can be removed at 67° C. from the second thermal storage tank which contains the latent heat storage material at 70° C., and delivered to the condenser 320. The condensing temperature of the refrigerant which exchanges heat with the hot water flowing into the condenser 320 at 67° C. is calculated as 81° C. on the assumption that the heat exchanging temperature efficiency is about 75% and the difference between outlet and inlet temperatures of the hot water is 10° C. Therefore, the desired dehumidifying air-conditioning (cooling) process can be performed by operating the heat pump 200 at the condensing temperature of 81° C.

Consequently, in the dehumidifying air-conditioning (so-called cooling) process using stored effects in daytime, the cycle of the first heat pump 200 has an operating state represented by the evaporating temperature of 11° C. and the condensing temperature of 81° C., and can operate with a temperature lift of 70° C. Under these conditions, the heat pump 200 has a coefficient of performance which is about 2.0 if the refrigerant is R134a and a two-stage economizer cycle is used. Since the heat discharged from the heat pump 200 is used to heat the regenerating air, the dehumidifying air-conditioning system according to the present invention saves more energy than the conventional air-conditioning systems. The reasons for the energy saving effect will be described below.

Figure 11:
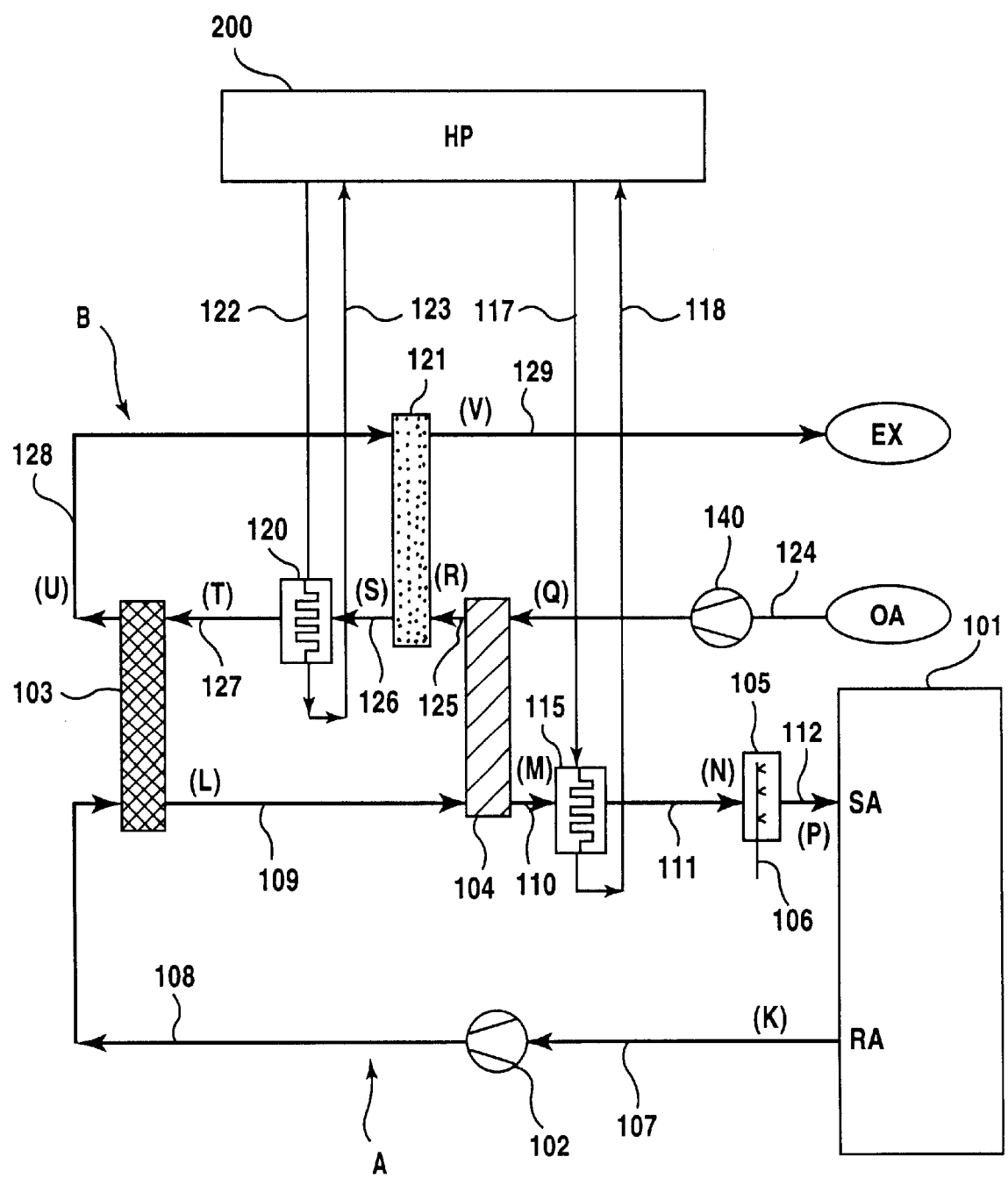
FIG. 11 is a view showing a conventional air-conditioning system comprising a combination of an absorption heat pump and a desiccant air-conditioning unit.

If the input to the compressor is 1.0, then the heat pump can achieve a cooling affect of 2.0, and can simultaneously heat the regenerating air with a heat quantity of 3.0. Although the coefficient of performance of the desiccant air-conditioning unit as shown in FIG. 11 varies depending on the regenerating temperature and meteorological conditions, if the temperature of the regenerating air is 70° C. according to the present embodiment, then the coefficient of performance of the desiccant cooling cycle may be in the range from 0.5 to 0.8. Even if the coefficient of performance of the desiccant cooling cycle is 0.5, then a cooling effect of 0.5×3.0=1.5 can be achieved. Therefore, the total cooling effect is 3.5, i.e., the sum of the cooling effect 2.0 of the heat pump and the cooling effect 1.5 of the desiccant cooling cycle. In this case, the overall coefficient of performance is 3.5, indicating an energy saving capability that is 17% better than an average value of 2.9 of conventional air-conditioning units. Furthermore, the operation cost can greatly be lowered because inexpensive midnight power services can be used.

Figure 12:
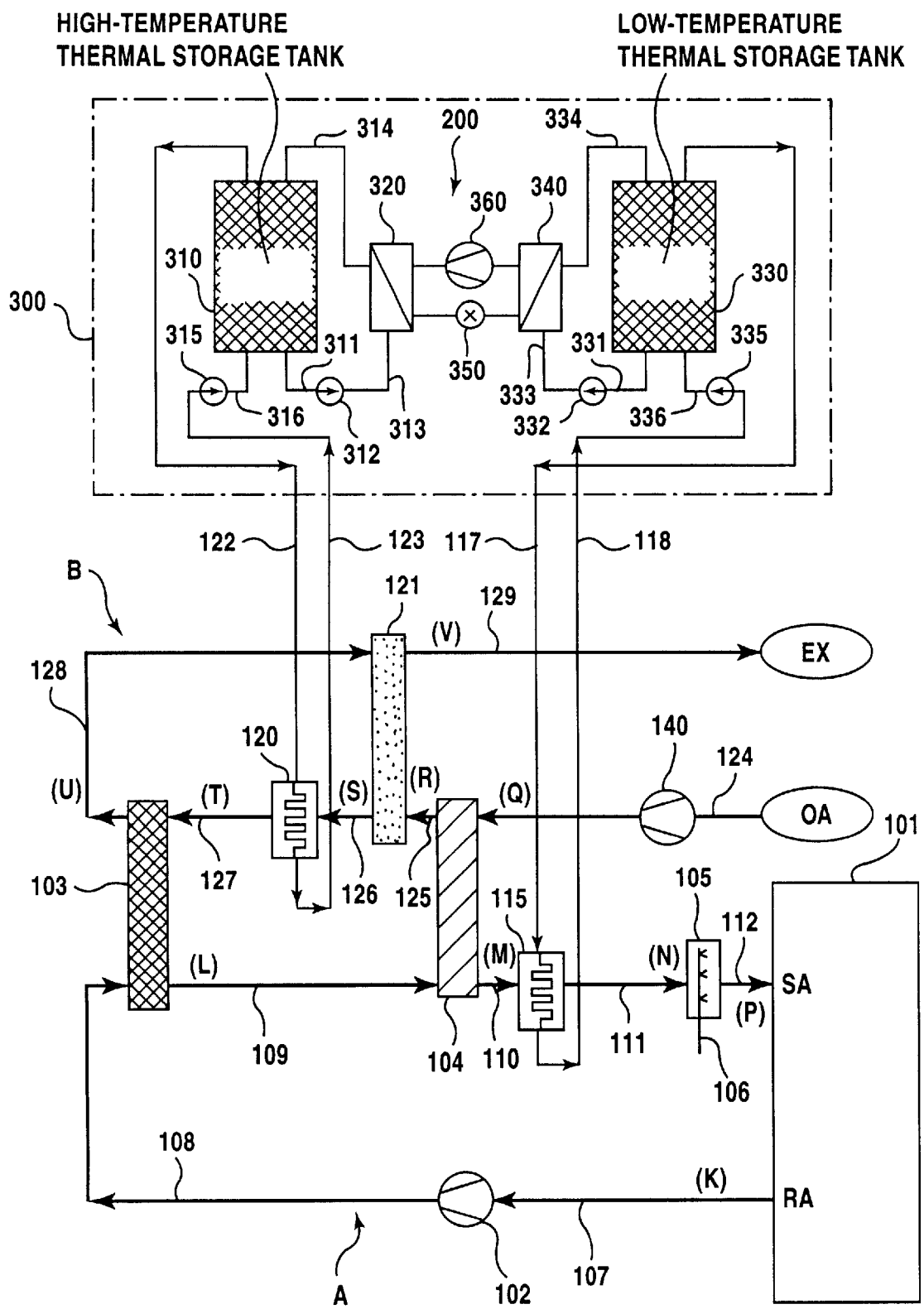
FIG. 12 is a view showing an air-conditioning apparatus including a heat source and the desiccant air-conditioning unit shown in FIG. 11 which is coupled to the heat source.

According to the present invention, as described above, in the thermal storage operation using midnight power services or in the dehumidifying air-conditioning (so-called cooling) process using stored cooling and heating effects in daytime, the temperature lift of the heat pump may be much smaller (70° C. in the thermal storage operation at night and 70° C. in the air-conditioning operation in daytime) than that with the arrangement (86° C.) shown in FIG. 12 for a better energy saving capability. Moreover, the air-conditioning system can store both cooling effect and heating effect simultaneously at night, and discharges no heat whatsoever into the atmosphere thereby to prevent thermal pollution, i.e., prevent the city from becoming a heat island at night. Such an ability has not been achieved heretofore.

In this embodiment, the heat pump for thermal storage and the heat pump for operation in daytime comprise the same vapor compression heat pump. However, for using inexpensive midnight power services, a heat pump using a Peltier device capable of quiet operation yet with low efficiency can be used as the heat pump for heat storage.

Figure 4:
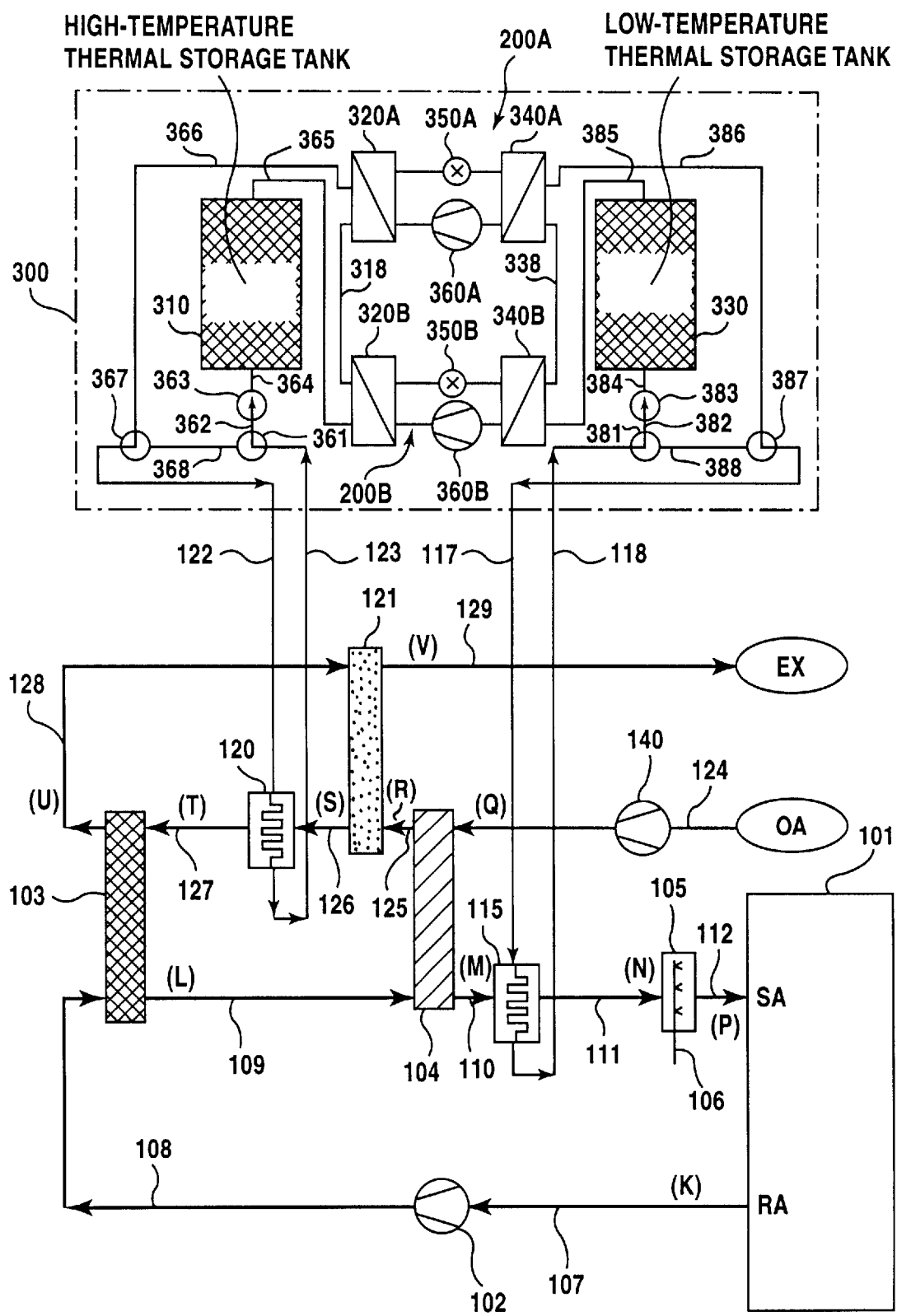
FIG. 4 is a view showing a basic arrangement of a dehumidifying air-conditioning system according to a second embodiment of the present invention.

FIG. 4 shows a basic arrangement of a dehumidifying air-conditioning system according to a second embodiment of the present invention. In the second embodiment, the heat pump employs a plurality of cycles, i.e., the cycle of a first vapor compression heat pump 200A comprising a compressor 360A, a condenser 320A, an expansion valve 350A, and an evaporator 340A, and the cycle of a second vapor compression heat pump 200B comprising a compressor 360B, a condenser 320B, an expansion valve 350B, and an evaporator 340B. A chilling medium circulation path and a heating medium circulation path are arranged such that the high temperature heat source heat exchanger (condenser) 320B of the heat pump 200B which has the low temperature heat source heat exchanger (evaporator) 340B that is downstream in the chilling medium circulation path is disposed upstream of the other high temperature heat source 320A in the heating medium circulation path. The dehumidifying air-conditioning system shown in FIG. 4 operates for thermal storage and air-conditioning in daytime in substantially the same manner as in the case of the dehumidifying air-conditioning system according to the first embodiment. In the second embodiment, however, the temperature lift of the first and second heat pumps 200A, 200B is reduced for a much better energy saving capability. The reasons for such a much better energy saving capability will be described below with reference to FIGS. 5 and 6.

Figure 5:
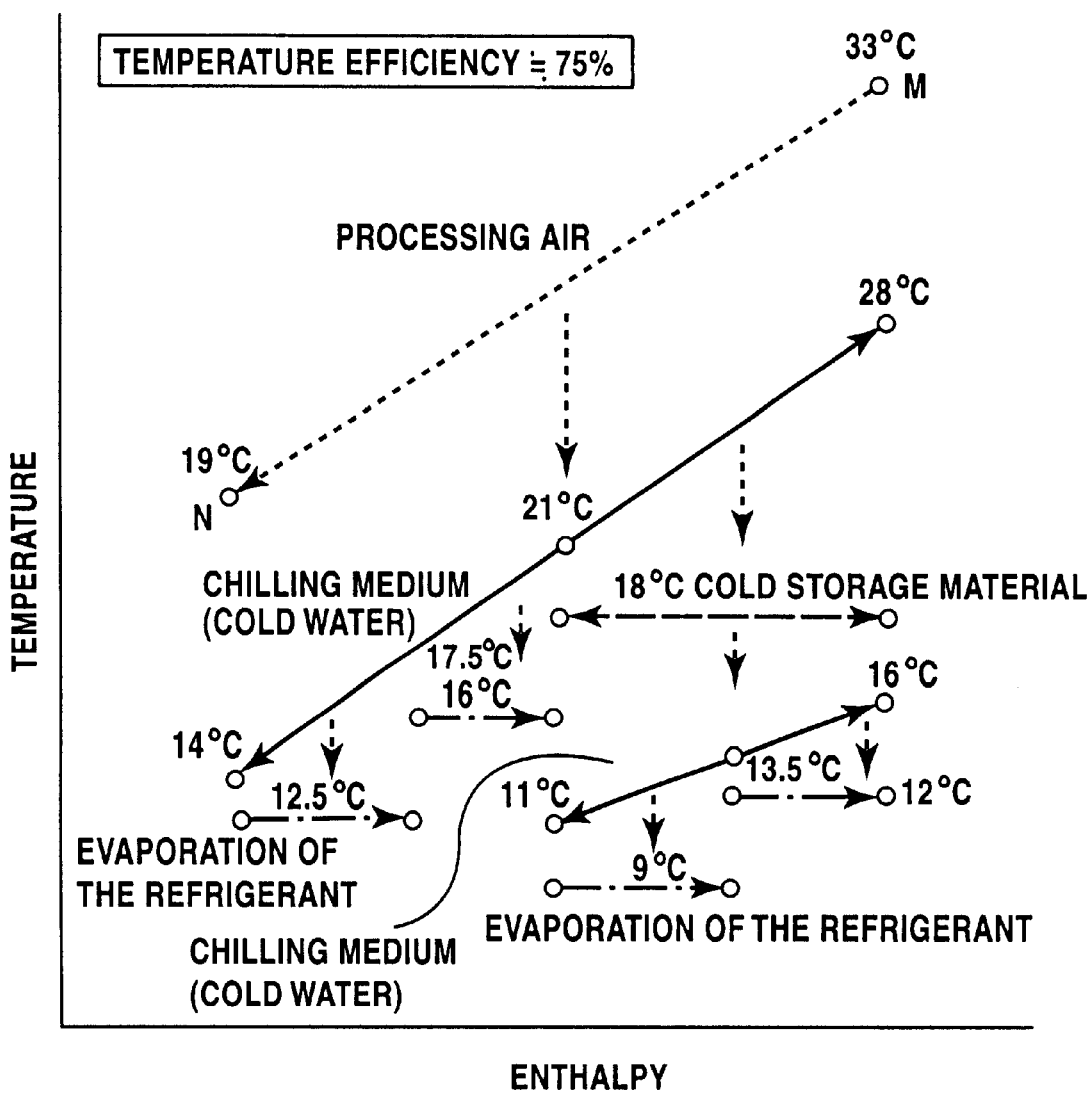
FIG. 5 is a diagram showing the relationship between the operating temperatures and enthalpic changes of processing air, a latent heat storage material, a chilling medium, and a heat pump according to the second embodiment.
Figure 6:
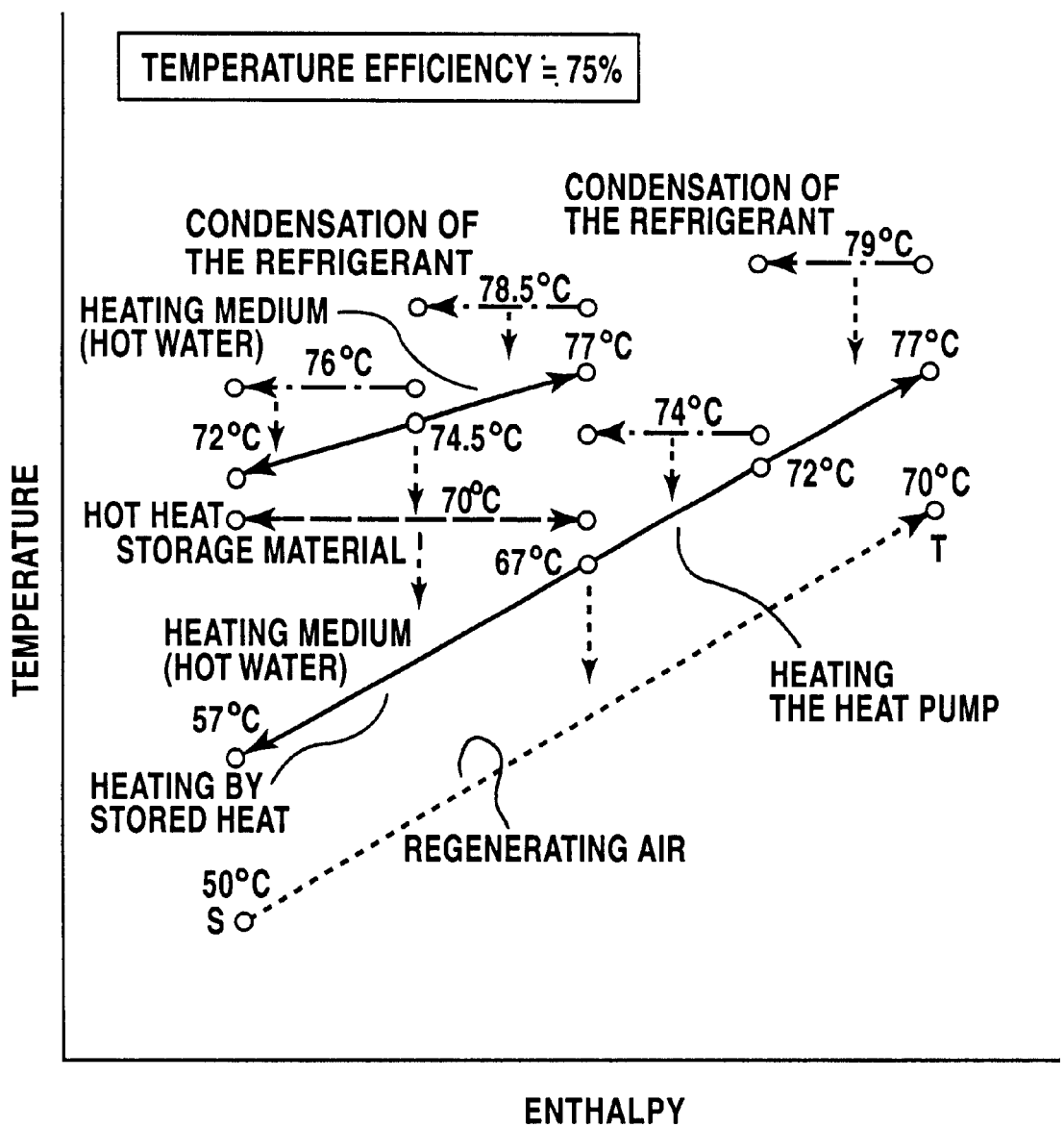
FIG. 6 is a diagram showing the relationship between the operating temperatures and enthalpic changes of regenerating air, a latent heat storage material, a heating medium, and a heat pump according to the third,embodiment.

FIG. 5 is a diagram showing the relationship between the operating temperatures and enthalpic changes of the processing air, the latent heat storage material, the chilling medium, and the heat pumps according to the second embodiment. FIG. 6 is a diagram showing the relationship between the operating temperatures and enthalpic changes of the regenerating air, the latent heat storage material, the heating medium, and the heat pumps according to the second embodiment.

In FIG. 5, since the cooling process of the heat pumps is divided into processes performed by the two evaporators, the evaporating temperature of the first heat pump 200A in the operation for thermal storage is 9° C. and the evaporating temperature of the second heat pump 200B in the operation for thermal storage is 12° C. In FIG. 6, since the heating process of the heat pumps is divided into processes performed by the two condensers, the condensing temperature of the first heat pump 200A in the operation for thermal storage is 76° C. and the condensing temperature of the second heat pump 200B in the operation for thermal storage is 78.5° C. Therefore, the temperature lift of the first heat pump 200A is 67° C., and the temperature lift of the second heat pump 200B is 66.5° C.

For the operation in daytime, the evaporating temperature of the first heat pump 200A is 12.5° C. and the evaporating temperature of the second heat pump 200B is 16° C. as shown in FIG. 5, and the condensing temperature of the first heat pump 200A is 74° C. and the evaporating temperature of the second heat pump 200B is 79° C. as shown in FIG. 6. Therefore, the temperature lift of the first heat pump 200A is 61.5° C., and the temperature lift of the second heat pump 200B is 63° C.

Based on the fact that temperature changes of the processing air and the regenerating air in the desiccant air-conditioning unit are caused by sensible heat changes and are large, the heat pump cycle is divided into a plurality of heat pump cycles, one composed of a combination of the low temperature heat source of lower temperature and the high temperature heat source of lower temperature, and one composed of a combination of the low temperature heat source of higher temperature and the high temperature heat source of higher temperature. The temperature lifts of the respective heat pumps are thus reduced for an energy saving effect. Specifically, the temperature lift is 5% lower than that in the first embodiment for the operation for thermal storage and 11% lower than that in the first embodiment for the operation in daytime, resulting in a better energy saving capability.

The heat pump cycle may be divided into two or more cycles, and the low heat source and the high temperature heat source in each of the cycles may be arranged respectively in forward and reverse orientations in the chilling medium circulation path and the heating medium circulation path for a further reduction in the temperature lifts.

Figure 7:
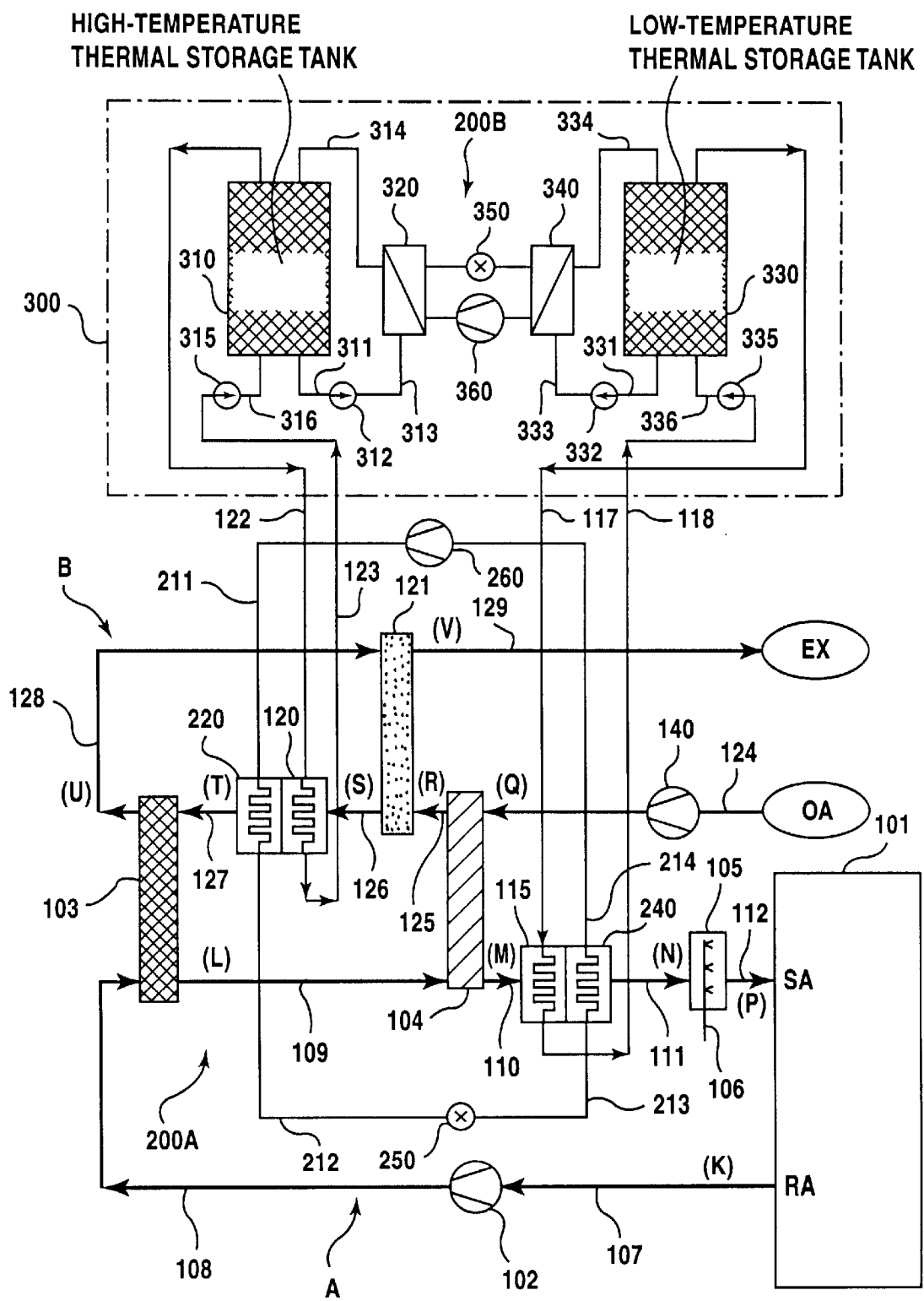
FIG. 7 is a view showing a basic arrangement of a dehumidifying air-conditioning system according to a third embodiment of the present invention.

FIG. 7 shows a basic arrangement of a dehumidifying air-conditioning system according to a third embodiment of the present invention.

In the third embodiment, a desiccant air-conditioning unit which has a first heat pump 200A connected to a heat source assembly 300 by two heat transfer medium paths is constructed as follows:

A desiccant wheel 103 is arranged such that a desiccant rotates in given cycles across both a processing air path A and a regenerating air path B, as in the case of the system described with reference to FIG. 12. The processing air path A connects an air-conditioned space to an inlet port of a fan 102 for introducing return air via a path 107. The fan 102 has an outlet port connected to a first zone of the desiccant wheel 103 for performing a process of adsorbing moisture, via a path 108. The desiccant wheel 103 has an outlet for processing air which is connected to a sensible heat exchanger 104 that is in heat exchanging relationship to regenerating air, via a path 109. The sensible heat exchanger 104 has an outlet for processing air which is connected to a cooler 115 that exchanges heat with a chilling medium (cold water) of the heat source assembly 300, via a path 110. The cooler 115 has an outlet for processing air which is connected to a humidifier 105 via a path 111. The humidifier 105 has an outlet for processing air which is connected to a processing air outlet as an air supply port via a path 112. The processing air path A thus forms a cycle for processing air.

The regenerating air path B connects an inlet port of a fan 140 for introducing outside air which will serve as regenerating air, via a path 124. The fan 140 has an outlet port connected to the sensible heat exchanger 104 which is in heat exchanging relationship to processing air. The sensible heat exchanger 104 has an outlet for regenerating air which is connected to a low-temperature fluid passage of a sensible heat exchanger 121. The sensible heat exchanger 121 is in heat exchanging relations hip to regenerating air which has regenerated the desiccant. The sensible heat exchanger 121 has an outlet for low-temperature regenerating air which is connected to a heater 120 which exchanges heat with a heating medium (hot water) of the heat source assembly 300, via a path 126. The heater 120 has an outlet for regenerating air which is connected to a condenser 220 of the first heat pump 200A. The condenser 220 has an outlet for regenerating air which is connected to a second zone of the desiccant wheel 103 for performing a process of the regeneration of regenerating air, via a path 127. The second zone of the desiccant wheel 103 for performing the process of the regeneration of regenerating air has an outlet for regenerating air which is connected to a high-temperature fluid passage of the sensible heat exchanger 121 via a path 128. The sensible heat exchanger 121 has a high-temperature fluid passage outlet connected to the external space via a path 129. The regenerating air path B thus forms a cycle for introducing regenerating air from the external space and discharging regenerating air into the external space.

The first heat pump 200A is a vapor compression heat pump which provides a refrigeration cycle having, as major components, a compressor 260, a low temperature heat source heat exchanger (evaporator) 240, a high temperature heat source heat exchanger (condenser) 220, and an expansion valve 250, and also provides a cycle in which a wet vapor of a low-pressure refrigerant is in heat exchanging relationship to the processing air that has passed through the desiccant wheel 103 and has been cooled by the cooler 115 and the evaporator 240, and a wet vapor of a high-pressure refrigerant is in heat exchanging relationship to the regenerating air which is to pass through the desiccant wheel 103 and has been heated by the heater 120.

Circled alphabetical letters D–V in FIG. 7 are representative of respective states of air which correspond to those shown in FIG. 13. As in the case of the conventional dehumidifying air-conditioning systems, the desiccant which rotates in given cycles across both the processing air path A and the regenerating air path B is divided into the first zone which is connected to the processing air path A via the paths 108, 109 for performing the process of adsorbing moisture, and the second zone which is connected to the regenerating air path B via the paths 127, 128 for performing the process of the regeneration of regenerating air. The desiccant goes through the first zone and the second zone, and returns to the first zone.

The desiccant air-conditioning unit including the first heat pump 200A is thus constructed. The desiccant air-conditioning unit and the heat source assembly 300 are connected to each other by a first chilling medium circulation path for transferring heat to a first thermal storage device 330 and leading the removed cooling effect to the heat exchanger (cooler) 115 for cooling processing air, i.e., a chilling medium circulation path, and a first heating medium circulation path for removing a hot heat from a second thermal storage device 310 and leading the removed heating effect to the heat exchanger (heater) 120 for heating regenerating air, i.e., a heating medium circulation path. The chilling medium circulation is a circulation path through a path 117, the heat exchanger (cooler) 115, a pump 335, a path 336, the thermal storage device 330, and a path 118. The heating medium circulation path is a circulation path through a path 122, the heat exchanger (heater) 120, a pump 315, a path 316, the thermal storage device 310, and a path 123.

The heat source assembly 300 with a thermal storage function has the first thermal storage device (low-temperature thermal storage tank) 330 for cooling processing air and the second thermal storage device (high-temperature thermal storage tank) 310 for heating regenerating air. The heat source assembly 300 also has, as a (second) heat pump 200B for thermal storage, a vapor compression heat pump comprising a compressor 360, a condenser 320, an expansion valve 350, and an evaporator 340, a second chilling medium circulation path (cold water circulation path), and a second heating medium circulation path (hot water circulatory system). The second chilling medium circulation path is a circulation path through a pump 332, a path 333, an evaporator 340, a path 334, the low-temperature thermal storage tank 330, and a path 331. The second heating medium circulation path is a circulation path through a pump 312, a path 313, a condenser 320, a path 314, the high-temperature thermal storage tank 310, and a path 311. The heat source assembly 300 is connected to the desiccant air-conditioning unit including the first heat pump 200A by the first chilling medium circulation path and the first heating medium circulation path. The first chilling medium circulation path is circulation path through the pump 335, the path 336, the first thermal storage device 330, the path 117, the cooler 115, and the path 118. The first heating medium circulation path is a circulation path through the pump 315, the path 316, the second thermal storage device 310, the path 123, the path 122, the heater 120, and the path 123. The first thermal storage device (low-temperature thermal storage tank) 330 contains a latent heat storage material which undergoes a latent heat change in the range from 16 to 26° C. or higher, e.g., fuses from a solid into a liquid, to absorb heat from the chilling medium, when it exchanges heat with the chilling medium, and the second thermal storage device (high-temperature thermal storage tank) 310 contains a latent heat storage material which undergoes a latent heat change in the range from 62 to 72° C. or lower, e.g., solidifies from a liquid into a solid, to radiate heat into the heating medium, when it exchanges heat with the heating medium.

Such latent heat storage materials are introduced by the above known literature (e.g., Japan Refrigeration Association "Refrigeration", Vol. 71, No. 823; Energy Resources Society "Energy storage system", 1992, Osaka; Heat Storage/ Heat Increase Technical Committee "Heat storage/ heat increase technology", IrP, Tokyo, 1985; Industrial Technical Council/Energy Saving Technology Development Sectional Meeting, Super Heat Pump/Energy Integration System Research and Development Evaluation 10 Report, New Energy/Industrial Technical Development Mechanism, Fuel/Storage Development Department, Tokyo, 1993, etc.).

Operation of the dehumidifying air-conditioning system thus constructed will be described below with reference to FIGS. 8 and 9.

Figure 8:
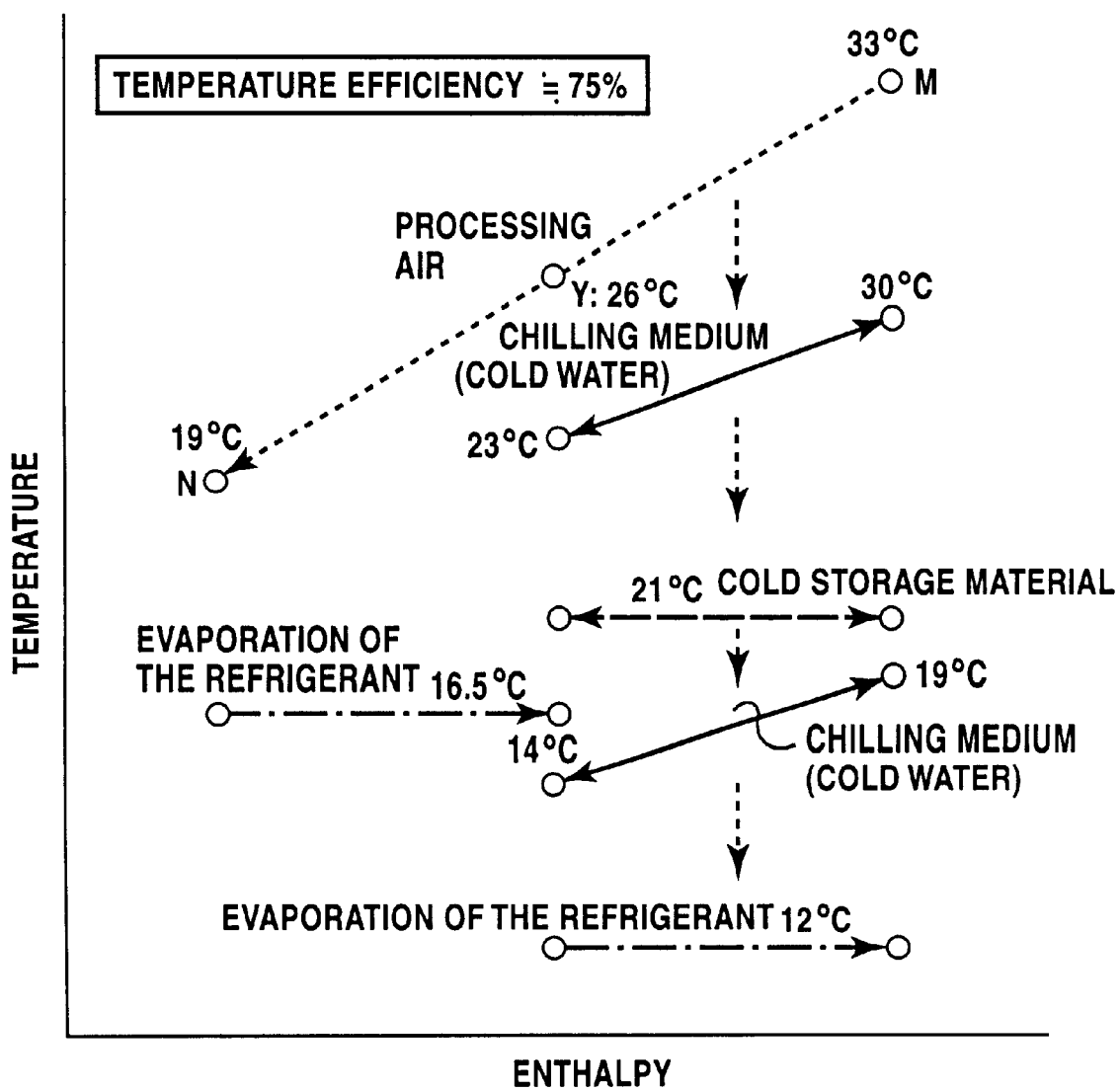
FIG. 8 is a diagram showing the relationship between the operating temperatures and enthalpic changes of processing air and various parts according to the third embodiment.

FIG. 8 is a diagram showing the relationship between the operating temperatures and enthalpic changes of the processing air, the latent heat storage material, the cold water in the first chilling medium circulatory system and the second chilling medium circulatory system, and the first and second heat pumps 200A, 200B according to the third embodiment. FIG. 9 is a diagram, showing the relationship between the operating temperatures and enthalpic changes of the regenerating air, the latent heat storage material, the hot water in the first heating medium circulatory system and the second heating medium circulatory system, and the first and second heat pumps 200A, 200B according to the third embodiment.

Figure 9:
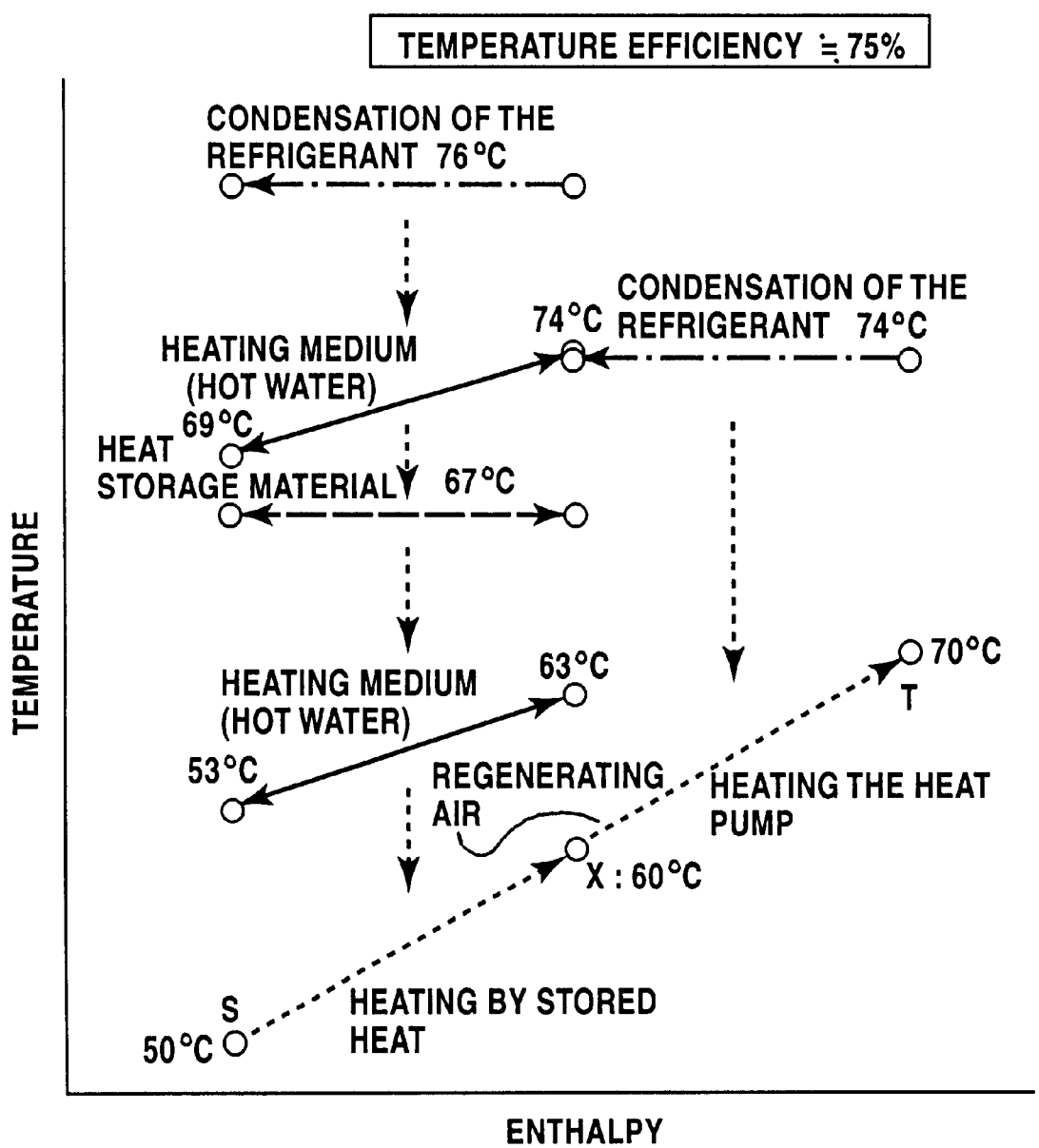
FIG. 9 is a diagram showing the relationship between the operating temperature and enthalpic changes of regenerating air and various parts according to the third embodiment.

In FIGS. 8 and 9, for an easier understanding of the operation, the temperatures of latent heat changes of the latent heat storage material are represented by intermediate temperatures of the latent heat change, with 21° C. for lower temperatures and 67° C. for higher temperatures. Practically, however, a material whose phase change occurs within the above temperature range may be employed for achieving the advantages of the present invention.

First, a mode of operation of the heat source assembly 300 for thermal storage using midnight power services will be described below.

In this mode of operation, the second heat pump is operated to pass the heat transfer medium in the second chilling medium circulation path and the second heating medium circulation path. Specifically, the compressor 330, the pump 332, and the pump 312 are operated to circulate the heat transfer medium through the second chilling medium circulation path (cold water system) and the second heating medium circulation path (hot water system). The second chilling medium circulation path is a circulation path through the pump 332, the path 333, the evaporator 340, the path 334, the low-temperature thermal storage tank 330, and the path 331. The second heating medium circulation path is a circulation path through the pump 312, the path 313, the condenser 320, the path 314, the high-temperature thermal storage tank 310, and the path 311.

In this mode of operation, the evaporator 340 of the second heat pump cools cold water in the second chilling medium circulation path. The cold water cooled by the evaporator 340 cools the latent heat storage material in the low-temperature thermal storage tank 330 to solidify the latent heat storage material when the temperature of the latent heat storage material is lowered to 21° C. or lower. The condenser 320 of the second heat pump heats hot water in the second heating medium circulation path. The hot water heated by the condenser 320 heats the latent heat storage material in the high-temperature thermal storage tank 310 to fuse the latent heat storage material when the temperature of the latent heat storage material is elevated to 67° C. or higher. The phase change temperatures of the latent heat storage materials are established under daytime air-conditioning unit operating conditions as follows:

In this embodiment, if the amount of the processing air to be cooled by the thermal storage tank is half the total amount to be cooled, then the processing air is cooled to 26° C. which is intermediate between 33° C. and 19° C. by the thermal storage tank 330. A temperature change of the cold water which exchanges heat with the processing air is determined on the assumption that a temperature change of the cold water is 7° C. which is the same as the processing air temperature. If the heat exchanging temperature efficiency is about 75%, then the cold water at the inlet temperature of 23° C. exchanges heat with the processing air and its outlet temperature becomes 30° C. A phase change temperature of the latent heat material which has such a cooling effect is determined as 21° C. on the assumption that the heat exchanging temperature efficiency in the heat exchange in the thermal storage tank is about. 75% and the difference between outlet and inlet temperatures of the cold water is 7° C. Similarly, if the amount of the regenerating air to be heated by the thermal storage tank is half the total amount to be heated, then the regenerating air is heated to 60° C. which is intermediate between 50° C. and 70° C. by the thermal storage tank 310. A temperature change of the hot water which exchanges heat with the regenerating air is determined on the assumption that a temperature change of the hot water is 10° C. which is the same as the regenerating air temperature. If the heat exchanging temperature efficiency is about 75% then the hot water at the inlet temperature of 63° C. exchanges heat with the regenerating air and its outlet temperature becomes 53° C. A phase change temperature of the latent heat material which has such a heating effect is determined as 67° C. on the assumption that the heat exchanging temperature efficiency in the heat exchange in the thermal storage tank is about 75% and the difference between outlet and inlet temperatures of the cold water is 10° C.

In this manner, the cooling effect at 21° C. and the heating effect at 67° C. are simultaneously stored in the low-temperature thermal storage tank 330 and the high-temperature thermal storage tank 310. The evaporating temperature of the heat pump which is required at this time is calculated on the assumption that the heat exchanging temperature efficiency of each heat exchanger is about 75%, as shown in FIG. 8. If the difference between outlet and inlet temperatures of the thermal storage tank of the second chilling medium circulation path (cold water system) is 5° C., then the inlet temperature of the thermal storage tank is about 14° C., and the evaporating temperature is about 12° C. The condensing temperature of the heat pump is calculated on the assumption that the heat exchanging temperature efficiency of each heat exchanger is about 75%, as shown in FIG. 9. If the difference between outlet and inlet temperatures of the thermal storage tank of the second heating medium circulation path (hot water system) is 5° C., then the inlet temperature of the thermal storage tank is about 74° C., and the condensing temperature is about 76° C. Therefore, the cycle of the second heat pump 200B has an operating state represented by the evaporating temperature of 12° C. and the condensing temperature of 76° C., and can operate with a temperature lift of 64° C.

A mode of operation for a dehumidifying air-conditioning (so-called cooling) process using stored effects in daytime will be described below. Prior to this mode of operation, the above thermal storage mode of operation is carried out, and the first thermal storage tank (low-temperature thermal storage tank) 330 stores a cooling effect which is principally a latent heat whose phase change occurs at 21° C. and the second thermal storage tank (high-temperature thermal storage tank) 310 stores a heating effect which is principally a latent heat whose phase change occurs at 67° C. In this mode of operation, the first heat pump 200A is operated by the compressor 260 of the first heat pump 200A. In the heat source assembly 300, the compressor 360 of the second heat pump 200B is inactivated, and the pumps 335, 315 are operated to circulate the chilling and heating mediums through the respective two heat transfer medium paths interconnecting the heat source assembly 300 and the air-conditioning unit, i.e., the first chilling medium circulation path and the first heating medium circulation path. The first chilling medium circulation path is a circulation path through the path 117 for extracting cooling effect from the first thermal storage device 330 and leading the extracted cooling effect to the heat exchanger (cooler) 115 to cool the processing air, the heat exchanger (cooler) 115, the pump 335, the path 336, the thermal storage device 330, and the path 118. The first heating medium circulation path is a circulation path through the path 122 for extracting heating effect from the second thermal storage device 310 and leading the extracted heating effect to the heat exchanger (heater) 120 to cool the regenerating air, the heat exchanger (heater) 120, the pump 315, the path 316, the thermal storage device 310, and the path 123.

The cycle of the first heat pump 200A in the above mode of operation will be described below.

The refrigerant is evaporated in the low temperature heat source heat exchanger (evaporator) 240 by depriving the processing air dehumidified by the desiccant wheel 103 of evaporating latent heat. The refrigerant is drawn into the compressor 260 via the path 214, and compressed thereby. The refrigerant then flows via the path 211 into the high temperature heat source heat exchanger (condenser) 220 in which it discharges the sensible heat and condensing latent heat of the superheated vapor of the refrigerant into the regenerating air that is to enter the desiccant wheel 103. The refrigerant flows via the path 212 to the expansion valve 250 in which it is reduced in pressure and expanded, and thereafter returns to the evaporator 240.

Operation of the dehumidifying air-conditioning unit which uses the heat pumps and the thermal storage devices as heat sources will be described below with reference to the psychrometric chart shown in FIG. 13.

Introduced return air (processing air: state K) is drawn via the path 107 by the fan 102, increased in pressure, and supplied via the path 108 to the first zone of the desiccant wheel 103 where moisture in the air is adsorbed by a moisture adsorbent of the desiccant wheel 103, the humidity ratio of the air is lowered, and the temperature of the air is increased by the heat of adsorption (state L). The air whose humidity is lowered and temperature is increased is sent via the path 109 to the sensible heat exchanger 104 where the air is cooled by a heat exchange with regenerating air (state M). The cooled air is delivered via the path 110 to the cooler 115 which cools the air with the cold water from the low-temperature thermal storage tank 330. The processing air which has left the cooler 115 passes through the evaporator 240 and is further cooled by the first heat pump 200A (state N). The cooled processing air is then delivered to the humidifier 105 where the temperature of the air is lowered in an isenthalpic process by the way of water injection or evaporative cooling (state P), after which the air is returned as supply air via the path 112 to the air-conditioned room.

The desiccant wheel 103 is regenerated as follows: Outside air (state Q) to be used as regenerating air is drawn via the path 124 by the fan 140, increased in pressure, and supplied to the sensible heat exchanger 104 where the regenerating air cools the processing air (state whose moisture has been adsorbed by the desiccant and is increased in temperature (state R). The regenerating air thus flows to the sensible heat exchanger 121 which increases the temperature of the regenerating air (state R) by a heat exchange with the regenerating air (state U) that has regenerated the desiccant. The regenerating air flows via the path 126 into the heater 120 where the regenerating air is heated by hot water from the high-temperature thermal storage tank 310. The regenerating air from the heater 120 is delivered to the condenser 220 where the regenerating air is increased in temperature by being heated by the refrigerant (state T). The regenerating air which has left the condenser 220 passes through the second zone of the desiccant wheel 103 for regenerating the regenerating air, desorbing moisture of the desiccant wheel 103 to regenerate the desiccant wheel 103 (state U). The regenerating air (state U) which has passed through the desiccant wheel 103 flows via the path 128 into the sensible heat exchanger 121 where the regenerating air is reduced in temperature (state V) by exchanging heat with the regenerating air (state R) prior to regenerating the desiccant. The regenerating air is then discharged via the path 129 as discharged air.

In this manner, the regeneration of the desiccant, the dehumidification of the processing air, and the cooling of the processing air are repeated to perform desiccant air-conditioning operation. In this embodiment, because of the cooler 115 for cooling, with the cold head of the first thermal storage device, the processing air before it is cooled by the low temperature heat source of the first heat pump 200A, and also of the heater 120 for heating, the heating effect of the second thermal storage device, the regenerating air before it is heated by the high temperature heat source of the first heat pump 200A, the air-conditioning process can be carried out without increasing the temperature lift of the first heat pump 200A. The reasons for the above air-conditioning process will be described below with reference to FIGS. 8 and 9.

FIG. 8 shows the temperature relationship of the low temperature heat source required to cool the processing air from 33° C. to 19° C. in the dehumidifying air-conditioning (so-called cooling) process using stored cooling and heating effects.

Before the processing air is cooled by the low temperature heat source of the first heat pump 200A, the processing air is cooled by the cooler 115. The temperature of cold water as the cooling heat source is calculated as follows; In the first chilling medium circulation path through the first thermal storage device 330, since a phase change temperature of the latent heat storage material is determined as 21° C. on the assumption that the amount of the processing air to be cooled by the thermal storage tank is half the total amount to be cooled, if the heat exchanging temperature efficiency is about 75% and the difference between outlet and inlet temperatures of the cold water is 7° C., then the cold water can start exchanging heat with the latent heat storage material at 30° C., and can be removed at 23° C. for use in cooling the processing air. The outlet temperature of the processing air at the inlet temperature of 33° C. which exchanges heat with the cold water flowing into the cooler 115 at 23° C. is calculated as follows: If the heat exchanging temperature efficiency is about 75% and the difference between outlet and inlet temperatures of the cold water is 7° C., then the outlet temperature of the processing air is 26° C. Specifically, the processing air is cooled to 26° C. by the first thermal storage device 330, and then cooled by the low temperature heat source (evaporator) 240 of the first heat pump 200A. When the processing air is cooled by the low temperature heat source (evaporator) 240 of the first heat pump 200A, the evaporating temperature of the refrigerant as the cooling heat source is calculated as 16.5° C. if the heat exchanging temperature efficiency is about 75% and the difference between outlet and inlet temperatures of the processing air is 7° C. Therefore, the desired dehumidifying air-conditioning (cooling) process can be performed by operating the first heat pump 200A at the evaporating temperature of 16.5° C.

Similarly, before the regenerating air is cooled by the high temperature heat source of the first heat pump 200A, the regenerating air is heated by the heater 120. The temperature of hot water as the heating source is calculated as follows: In the first heating medium circulation path through the second thermal storage device 310, since a phase change temperature of the latent heat storage material is determined as 67° C. on the assumption that the amount of the regenerating air to be heated by the thermal storage tank is half the total amount to be heated, if the heat exchanging temperature efficiency is about 75% and the difference between outlet and inlet temperatures of the hot water is 10° C., then the hot water can start exchanging heat with the latent heat storage material at 53° C., and can be removed at 63° C. for use in heating the regenerating air. The outlet temperature of the regenerating air at the inlet temperature of 63° C. which exchanges heat with the hot water flowing into the heater 120 at 63° C. is calculated as follows: If the heat exchanging temperature efficiency is about 75% and the difference between outlet and inlet temperatures of the hot water is 10° C., then the outlet temperature of the regenerating air is 60° C. Specifically, the regenerating air is heated to 60° C. by the second thermal storage device 310, and then heated by the high temperature heat source (condenser) 220 of the first heat pump 200A. When the regenerating air is heated by the high temperature heat source (condenser) 220 of the first heat pump 200A, the condensing temperature of the refrigerant as the heating source is calculated as 74° C. if the heat exchanging temperature efficiency is about 75% and the difference between outlet and inlet temperatures of the regenerating air is 10° C. Therefore, the desired dehumidifying air-conditioning (cooling) process can be performed by operating the first heat pump 200A at the condensing temperature of 74° C. Consequently, in the dehumidifying air-conditioning (so-called cooling) process using stored cooling and heating effects in daytime, the cycle of the first heat pump 200A has an operating state represented by the evaporating temperature of 16.5° C. and the condensing temperature of about 74° C., and can operate with a temperature lift of 57.5° C.

According to the present invention, as described above, in the thermal storage operation using midnight power services or in the dehumidifying air-conditioning (so-called cooling) process using stored thermal storage (cooling and heating effects) in daytime, the temperature lift of the heat pump may be much smaller (64° C. in the thermal storage operation at night and 57.5° C. in the air-conditioning operation in daytime) than that with the arrangement (86° C.) shown in FIG. 12 for a better energy saving capability. Inasmuch as the compression ratio may be substantially the same as in a heating mode of the ordinary air-conditioning system, the cost can be reduced by replacing the refrigerant, e.g., using R134a in a compressor for R22 or R407C, and using an inexpensive popular compressor for use in air-conditioning units. Moreover, the air-conditioning system can store both cooling effect and heating effect simultaneously at night, and discharges no heat whatsoever into the atmosphere thereby to prevent thermal pollution, i.e., prevent the city from becoming a heat island at night. Such an ability has not been achieved heretofore.

In this embodiment, the second heat pump 200B comprises a vapor compression heat pump. However, for using inexpensive midnight power services, a heat pump using a Peltier device capable of quiet operation yet with low efficiency can be used as the second heat pump.

Figure 10:
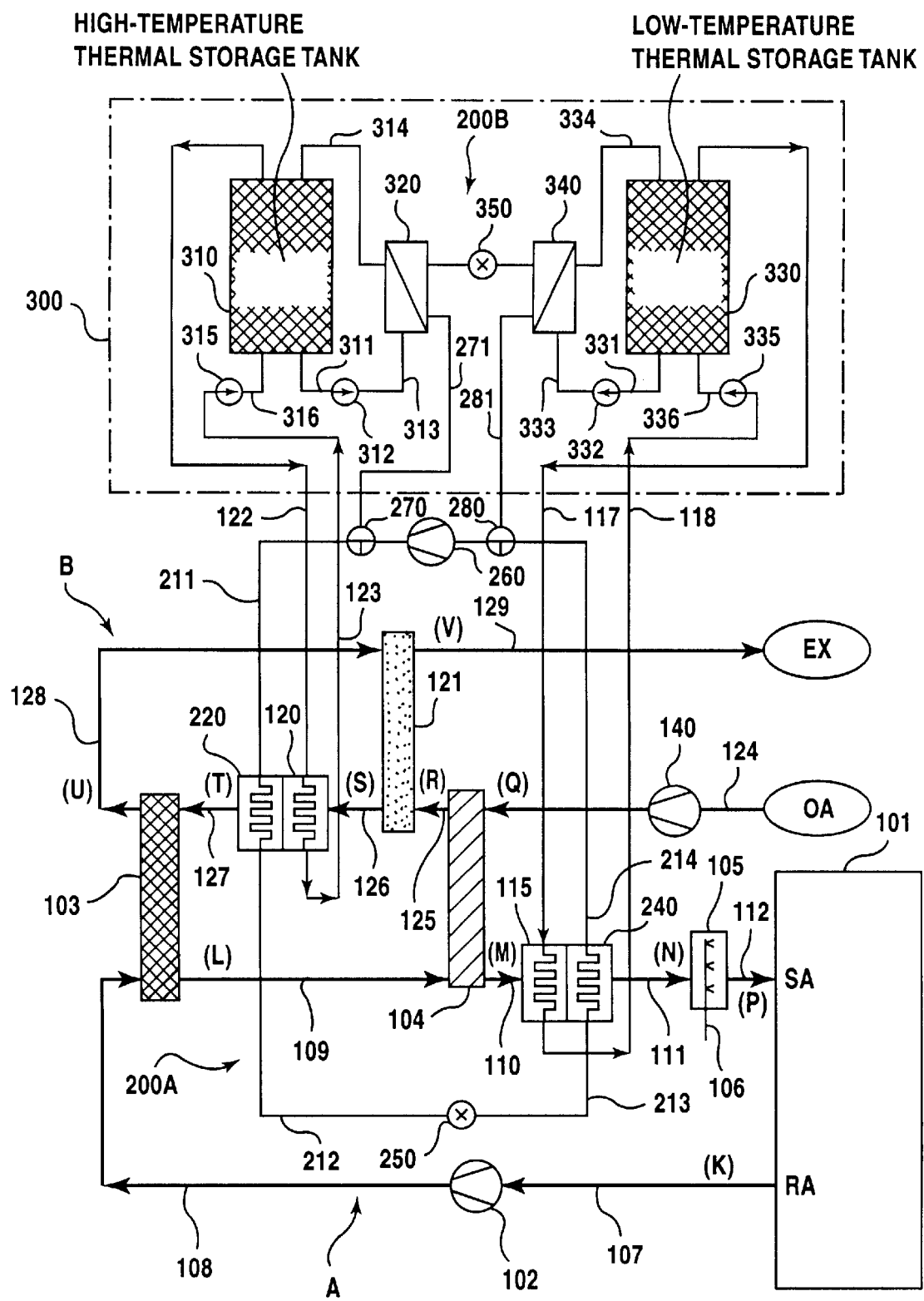
FIG. 10 is a view showing a basic arrangement of a dehumidifying air-conditioning system according to a fourth embodiment of the present invention.

FIG. 10 is a view showing a basic arrangement of a dehumidifying air-conditioning system according to a fourth embodiment of the present invention.

In the fourth embodiment, a second heat pump 200B comprises a vapor compression heat pump, and the first and second heat pumps 200A, 200B share a compressor. The first heat pump 200A has a compressor 260 having an outlet port connected to a three-way valve 270 and an inlet port connected to a three-way valve 280. The three-way valve 270 connects an outlet path of the compressor selectively to a path 271 leading to a high temperature heat source heat exchanger (condenser) 320 of the second heat pump 200B and a path 211 leading to a high temperature heat source heat exchanger (condenser) 220 of the first heat pump 200A. The three-way valve 280 connects an inlet path of the compressor selectively to a path 281 leading to a low temperature heat source heat exchanger (evaporator) 340 of the second heat pump 200B and a path 214 leading to a low temperature heat source heat exchanger (evaporator) 240 of the first heat pump 200A. For operation for thermal storage, the three-way valve 270 is shifted to connect the outlet path of the compressor to the path 271 leading to the high temperature heat source heat exchanger (condenser) 320 of the second heat pump 200B, and the three-way valve 280 is shifted to connect the inlet path of the compressor to the path 281 leading to the low temperature heat source heat exchanger (evaporator) 340 of the second heat pump 200B. For operation in daytime, the three-way valve 270 is shifted to connect the outlet path of the compressor to the path 211 leading to the high temperature heat source heat exchanger (condenser) 220 of the first heat pump 200A, and the three-way valve 280 is shifted to connect the inlet path of the compressor to the path 214 leading to the low temperature heat source heat exchanger (evaporator) 240 of the first heat pump 200A. The dehumidifying air-conditioning system according to the fourth embodiment thus operates in the same manner as the dehumidifying air-conditioning- system according to the third embodiment. The dehumidifying air-conditioning system shown in FIG. 10 operates for thermal storage and air-conditioning in daytime in the same manner as with the dehumidifying air-conditioning system according to the third embodiment. In the fourth embodiment, however, since the compressor is shared by the first and second heat pumps 200A, 200B, the cost required for the compressor may be lower, the installation space for the compressor may be smaller, and the equipment may be compact.

Industrial Applicability

The present invention is preferably applicable to an air-conditioning system for use in general houses or larger buildings such as of supermarkets, offices, and others.

What is claimed is:

1. A dehumidifying air-conditioning system having a heat pump for forming a vapor compression heat pump cycle, a path for processing air to be cooled by a low temperature heat source of the heat pump after moisture is adsorbed therefrom by a desiccant, and a path for regenerating air which, after being heated by a high temperature heat source of the heat pump, passes through the desiccant that has adsorbed moisture to regenerate the desiccant, the arrangement being such that the processing air and the regenerating air alternately flow through the desiccant, comprising: at least one chilling medium circulation path for cooling the processing air with the low temperature heat source of said heat pump, at least one heating medium circulation path for heating the regenerating air with the high temperature heat source of said heat pump, a first thermal storage device for cooling a chilling medium prior to being cooled by the low temperature heat source of said heat pump, and a second thermal storage device for heating a heating medium prior to being heated by the high temperature heat source of said heat pump, the arrangement being such that said heat pump operates with said first thermal storage device as the low temperature heat source and said second thermal storage device as the high temperature heat source, to store cooling effect in the first and heating effect in the second thermal storage devices.

2. A dehumidifying air-conditioning system according to claim 1, comprising a first chilling medium circulation path extending through the first thermal storage device, a low temperature heat source heat exchanger of the heat pump, and a heat exchanger for cooling the processing air, a second chilling medium circulation path extending through the first thermal storage device and the low temperature heat source heat exchanger of the heat pump, said first chilling medium circulation path and said second chilling medium circulation path being selectable one at a time, a first heating medium circulation path extending through the second thermal storage device, a high temperature heat source heat exchanger of the heat pump, and a heat exchanger for heating the regenerating air, and a second heating medium circulation path extending through the second thermal storage device and the high temperature heat source heat exchanger of the heat pump, said first heating medium circulation path and said second heating medium circulation path being selectable one at a time, the arrangement being such that in a mode of operation to discharge stored cooling and heating effects, a path provided by said first chilling medium circulation path and said first heating medium circulation path is selected to pass a heat transfer medium therethrough, and in a mode of operation to store the cooling and heating effects, a path provided by said second chilling medium circulation path and said second heating medium circulation path is selected to pass a heat transfer medium therethrough.

3. A dehumidifying air-conditioning system according to either one of claim 1 or claim 2, wherein the heat pump is constructed in two cycles, and the chilling medium circulation path and the heating medium circulation path are arranged such that the high temperature heat source of a second heat pump downstream of the low temperature heat source of the first cycle in the chilling medium circulation path is disposed upstream of the high temperature heat source of the first cycle in the heating medium circulation path.

4. A dehumidifying air-conditioning system according to either one of claim 1 or claim 2, wherein the heat pump is constructed in two cycles, and the low temperature heat source and the high temperature heat source of each of the cycles are arranged respectively in forward and reverse orientations in the chilling medium circulation path and the heating medium circulation path.

5. A dehumidifying air-conditioning system according to any one of claims 1 or claim 2, wherein the first thermal storage device contains a latent heat storage material which undergoes a latent heat change in the range from 13 to 23° C., and the second thermal storage device contains a latent heat storage material which undergoes a latent heat change in the range from 65 to 75° C.

6. A dehumidifying air-conditioning system according to claim 5, wherein the latent heat storage material contained in the second thermal storage device comprises n-paraffin having 30 to 35 carbon atoms.

7. A dehumidifying air-conditioning system having a first heat pump for forming a vapor compression heat pump cycle, a path for processing air to be cooled by a low temperature heat source of the first heat pump after moisture is adsorbed therefrom by a desiccant, and a path for regenerating air which, after being heated by a high temperature heat source of the first heat pump, passes through the desiccant that has adsorbed moisture to regenerate the desiccant, the arrangement being such that the processing air and the regenerating air alternately flow through the desiccant, comprising: a first thermal storage device for cooling the processing air prior to being cooled by the low temperature heat source of said first heat pump, and a second thermal storage device for heating the regenerating air prior to being heated by the high temperature heat source of said first heat pump, the arrangement being such that a second heat pump operates with said first thermal storage device as the low temperature heat source and said second thermal storage device as the high temperature heat source, to store cooling effect in the first and heating effect in the second thermal storage devices.

8. A dehumidifying air-conditioning system according to claim 7 wherein a first chilling medium circulation path for removing a cooling effect from the first thermal storage device and leading the cooling effect to a heat exchanger for exchanging heat with the processing air to cool the processing air, a first heating medium circulation path for removing a heating effect from the second thermal storage device and leading the heating effect to a heat exchanger for exchanging heat with the regenerating air to heat the regenerating air, a second chilling medium circulation path for removing a cooling effect from an evaporator of the second heat pump and sending the cooling effect to the first thermal storage device, a second heating medium circulation path for removing a heating effect from a condenser of the second heat pump and sending the hot heat to the second thermal storage device, the arrangement being such that in a mode of operation to store cooling and heating effects the second heat pump is operated to pass a heat transfer medium through said second chilling medium circulation path and said second heating medium circulation path, and in a mode of operation to discharge stored cooling and heating effects, said heat pump is inactivated to pass a heat transfer medium through said first chilling medium circulation path and said first heating medium circulation path.

9. A dehumidifying air-conditioning system according to either one of claim 8 or claim 7, wherein said second heat pump forms a vapor compression heat pump cycle, and said first and second heat pumps share a compressor.

10. A dehumidifying air-conditioning system according to claim 9, wherein the first thermal storage device contains a latent heat storage material which undergoes a latent heat change in the range from 16 to 26° C., and the second thermal storage device contains a latent heat storage material which undergoes a latent heat change in the range from 62 to 72° C.

11. A dehumidifying air-conditioning system according to claim 10, wherein the latent heat storage material contained in the first thermal storage device comprises paraffin-based n-hexadecane (C16H34).

12. A dehumidifying air-conditioning system according to claim 10, wherein the latent heat storage material contained in the first thermal storage device comprises an aqueous solution containing at least potassium acetate as a solute.

13. A dehumidifying air-conditioning system according to claim 10, wherein the latent heat storage material contained in the first thermal storage device comprises a mixture containing at least calcium chloride hexahydrate, magnesium chloride hexahydrate, and magnesium bromide hexahydrate.

14. A dehumidifying air-conditioning system according to either one of claim wherein the latent heat storage material contained in the first thermal storage device comprises a mixture containing at least calcium chloride hexahydrate and nickel nitrate hexahydrate.

15. A dehumidifying air-conditioning system according to claim 10, wherein the latent heat storage material contained in the first thermal storage device comprises a mixture containing at least calcium chloride hexahydrate and ferric nitrate nonahydrate.

16. A dehumidifying air-conditioning system according to claim 10, wherein in the latent heat storage material contained in the first thermal storage device comprises a mixture containing at least disodium hydrogenphosphate dodecahydrate.

17. A dehumidifying air-conditioning system according to claim 10, wherein the latent heat storage material contained in the first thermal storage device comprises a mixture containing at least sodium sulfate decahydrate and sodium carbonate.

18. A dehumidifying air-conditioning system according to claim 10, wherein the latent heat storage material contained in the first thermal storage device comprises a mixture containing at least sodium sulfate decahydrate and ammonium carbamate.

19. A dehumidifying air-conditioning system according to claim 10, wherein the latent heat storage material contained in the second thermal storage device comprises n-paraffin having 29 to 33 carbon atoms.

20. A dehumidifying air-conditioning system according to claim 10, wherein the latent heat storage material contained in the second thermal storage device comprises polyethylene glycol having a nominal molecular weight in the range from 5400 to 6600.

21. A dehumidifying air-conditioning system according to claim 10, wherein the latent heat storage material contained in the second thermal storage device comprises stearic acid.

22. A dehumidifying air-conditioning system according to claim 10, wherein the latent heat storage material contained in the second thermal storage device comprises biphenyl.

23. A dehumidifying air-conditioning system according to claim 10, wherein the latent heat storage material contained in the second thermal storage device comprises palmitic acid.

* * * * *

UNITED STATES PATENT AND TRADEMARK OFFICE
CERTIFICATE OF CORRECTION

PATENT NO. : 6,324,860 B1
DATED : December 4, 2001
INVENTOR(S) : Maeda et al.

It is certified that error appears in the above-identified patent and that said Letters Patent is hereby corrected as shown below:

<u>Title page,</u>
Item [30], Foreign Application Priority Data
change "Oct. 24, 1997 (JP) .......... 9-609613"
to be -- Oct. 24, 1997 (JP) .......... 9-309613 --

Signed and Sealed this

Eleventh Day of June, 2002

*Attest:*

JAMES E. ROGAN
*Director of the United States Patent and Trademark Office*

*Attesting Officer*